(12) United States Patent
Komsta et al.

(10) Patent No.: US 12,397,349 B2
(45) Date of Patent: Aug. 26, 2025

(54) ANGLED SCANNING OF LASER ARRAYS IN ADDITIVE MANUFACTURING

(71) Applicant: VulcanForms Inc., Devens, MA (US)

(72) Inventors: Jan Pawel Komsta, Northborough, MA (US); Alexander Dunbar, Watertown, MA (US); Raghav Aggarwal, Dracut, MA (US); Matthew Sweetland, Bedford, MA (US); Martin C. Feldmann, Sudbury, MA (US)

(73) Assignee: VulcanForms Inc., Devens, MA (US)

( * ) Notice: Subject to any disclaimer, the term of this patent is extended or adjusted under 35 U.S.C. 154(b) by 498 days.

(21) Appl. No.: 17/337,000

(22) Filed: Jun. 2, 2021

(65) Prior Publication Data

US 2021/0387263 A1    Dec. 16, 2021

Related U.S. Application Data

(60) Provisional application No. 63/037,142, filed on Jun. 10, 2020.

(51) Int. Cl.
| | |
|---|---|
| *B22F 10/85* | (2021.01) |
| *B22F 10/28* | (2021.01) |
| *B22F 12/41* | (2021.01) |
| *B23K 26/06* | (2014.01) |
| *B23K 26/082* | (2014.01) |

(Continued)

(52) U.S. Cl.
CPC .............. *B22F 10/85* (2021.01); *B22F 10/28* (2021.01); *B22F 12/41* (2021.01); *B23K 26/0608* (2013.01); *B23K 26/082* (2015.10); *B23K 26/342* (2015.10); *B33Y 10/00* (2014.12); *B33Y 30/00* (2014.12); *B33Y 50/02* (2014.12)

(58) Field of Classification Search
CPC .......... B22F 10/85; B22F 12/41; B22F 10/28; B33Y 10/00; B33Y 30/00; B33Y 50/02; B23K 26/082; B23K 26/342; B23K 26/0608
USPC ........................................ 219/76.1
See application file for complete search history.

(56) References Cited

U.S. PATENT DOCUMENTS

| | | |
|---|---|---|
| 9,956,612 B1 | 5/2018 | Redding et al. |
| 10,022,795 B1 | 7/2018 | Redding et al. |

(Continued)

FOREIGN PATENT DOCUMENTS

| | | |
|---|---|---|
| CN | 108274000 A | 7/2018 |
| CN | 110605390 A | 12/2019 |

(Continued)

OTHER PUBLICATIONS

International Search Report and Written Opinion for International Application No. PCT/US2021/035464, mailed Nov. 26, 2021.

(Continued)

*Primary Examiner* — Elizabeth M Kerr
*Assistant Examiner* — Simpson A Chen
(74) *Attorney, Agent, or Firm* — Wolf, Greenfield & Sacks, P.C.

(57) ABSTRACT

Systems and methods for additive manufacturing are described. In some embodiments, a method of controlling the one or more laser energy sources of an additive manufacturing system may be based at least in part on a scan angle and/or desired energy density. Systems and methods for controlling melt pool spacing are also described.

47 Claims, 16 Drawing Sheets

(51) Int. Cl.
    *B23K 26/342*     (2014.01)
    *B33Y 10/00*      (2015.01)
    *B33Y 30/00*      (2015.01)
    *B33Y 50/02*      (2015.01)

(56)         References Cited

U.S. PATENT DOCUMENTS

| 10,399,183 | B2 | 9/2019 | Dallarosa et al. |
| 2006/0255023 | A1* | 11/2006 | Jurgensen ................ B41C 1/05 |
| | | | 219/121.69 |
| 2015/0183165 | A1* | 7/2015 | Abe .......................... B22F 3/16 |
| | | | 264/497 |
| 2016/0158889 | A1 | 6/2016 | Carter et al. |
| 2016/0368050 | A1 | 12/2016 | Morris et al. |
| 2017/0021454 | A1* | 1/2017 | Dallarosa ............. B23K 26/073 |
| 2017/0021455 | A1 | 1/2017 | Dallarosa et al. |
| 2017/0056975 | A1 | 3/2017 | Carter et al. |
| 2017/0334099 | A1* | 11/2017 | Araie ...................... B22F 10/36 |
| 2018/0193955 | A1 | 7/2018 | Karp et al. |
| 2018/0200792 | A1 | 7/2018 | Redding et al. |
| 2018/0207722 | A1 | 7/2018 | Feldmann et al. |
| 2018/0236549 | A1 | 8/2018 | Spears et al. |
| 2018/0281113 | A1 | 10/2018 | Carter et al. |
| 2018/0326655 | A1 | 11/2018 | Herzog |
| 2019/0143406 | A1 | 5/2019 | Carter et al. |
| 2019/0232565 | A1 | 8/2019 | Pontiller-Schymura et al. |
| 2019/0299286 | A1 | 10/2019 | Feldmann et al. |
| 2020/0039000 | A1 | 2/2020 | Sweetland |
| 2020/0108465 | A1 | 4/2020 | Sweetland |
| 2021/0311466 | A1* | 10/2021 | Yang ....................... B22F 10/28 |

FOREIGN PATENT DOCUMENTS

| EP | 3 521 028 A1 | 8/2019 |
| KR | 10-1849999 B1 | 4/2018 |
| WO | WO 2016/201309 A1 | 12/2016 |

OTHER PUBLICATIONS

Extended European Search Report dated Jun. 11, 2024 in connection with European Application No. 21822731.2.

* cited by examiner

ANGLED SCANNING OF LASER ARRAYS IN ADDITIVE MANUFACTURING

CROSS-REFERENCE TO RELATED APPLICATIONS

This application claims the benefit of priority under 35 U.S.C. § 119(e) of U.S. Provisional Application Ser. No. 63/037,142, filed Jun. 10, 2020, the disclosure of which is incorporated herein by reference in its entirety.

FIELD

Disclosed embodiments are related to systems and methods for additive manufacturing.

BACKGROUND

Powder bed fusion processes are an example of additive manufacturing processes in which a three-dimensional shape is formed by selectively joining material in a layer-by-layer process. In metal powder bed fusion processes, one or more laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

SUMMARY

In some embodiments, a method of controlling an energy density in an additive manufacturing process includes determining a first desired energy density to be delivered to one or more portions of a build surface, determining a first desired scan angle of one or more laser energy sources, selectively activating the one or more laser energy sources based at least in part on the first desired energy density and the first desired scan angle, and translating the one or more laser energy sources in a first direction relative to the build surface corresponding to the first desired scan angle.

In some embodiments, an additive manufacturing system includes a build surface, one or more laser energy sources, and a processor operatively coupled to the one or more laser energy sources. The processor is configured to determine a first desired energy density to be delivered to one or more portions of the build surface, determine a first desired scan angle of the one or more laser energy sources, selectively activate the one or more laser energy sources based at least in part on the first desired energy density and the first desired scan angle, and translate the one or more laser energy sources in a first direction relative to the build surface corresponding to the first desired scan angle.

In some embodiments, a method of controlling melt pool spacing in an additive manufacturing process includes determining a desired melt pool spacing, determining a desired scan angle of a plurality of laser energy sources, selectively activating a plurality of separate portions of the plurality of laser energy sources based at least in part on the desired melt pool spacing and the desired scan angle to form a plurality of melt pools on the build surface that are spaced apart by the desired melt pool spacing, and translating the plurality of laser energy sources in a direction relative to the build surface corresponding to the desired scan angle.

In some embodiments, an additive manufacturing system includes a build surface, a plurality of laser energy sources, and a processor operatively coupled to the plurality of laser energy sources. The processor is configured to determine a desired melt pool spacing, determine a desired scan angle of the plurality of laser energy sources, selectively activate a plurality of separate portions of the plurality of laser energy sources based at least in part on the desired melt pool spacing and the desired scan angle to form a plurality of melt pools on the build surface that are spaced apart by the desired melt pool spacing, and translate the plurality of laser energy sources in a direction relative to the build surface corresponding to the desired scan angle.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
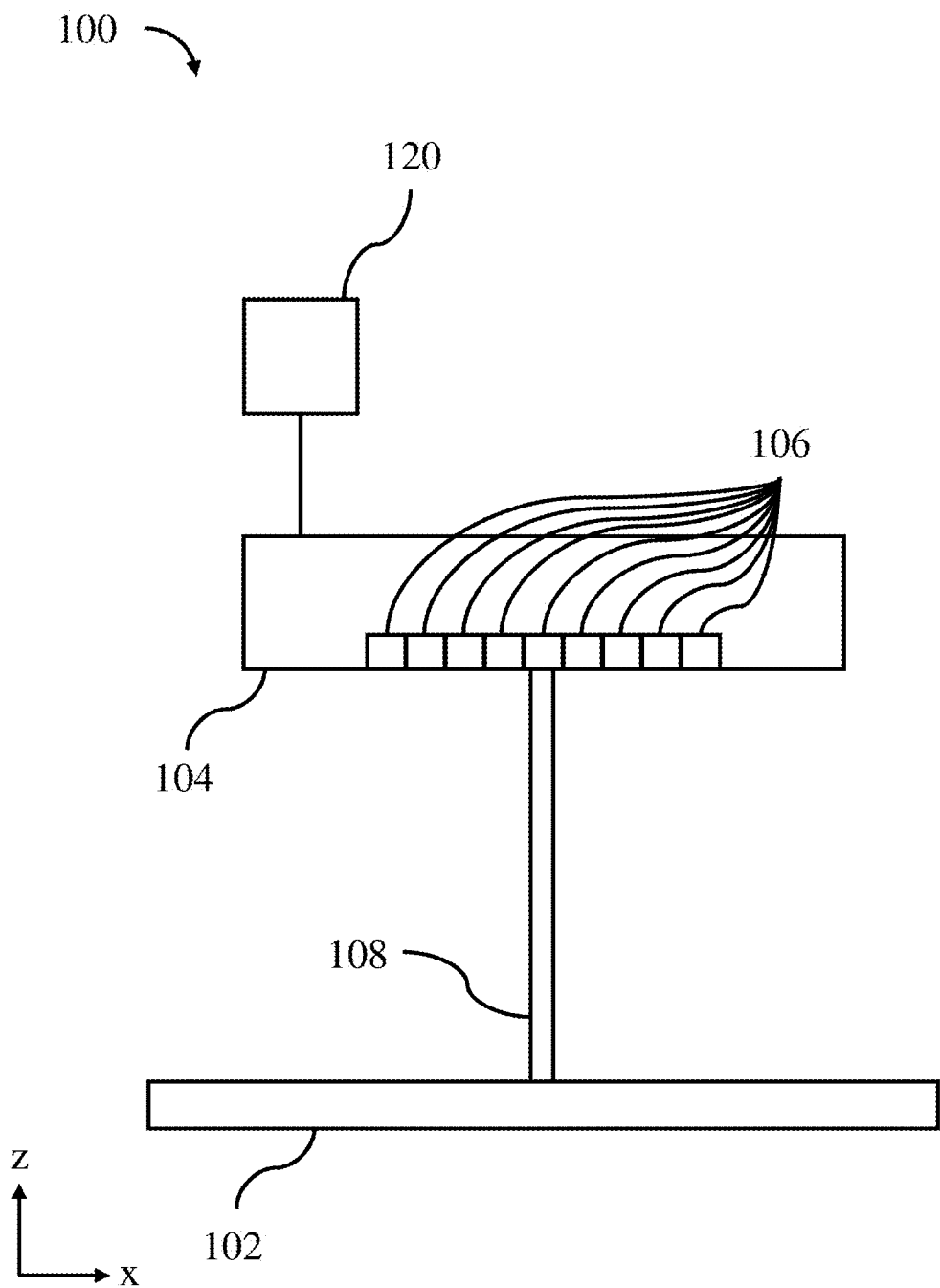
FIG. 1A is a front view of one embodiment of an additive manufacturing system in which a single laser of a laser assembly is activated.

In some additive manufacturing processes, such as powder bed fusion processes, one or more laser beams may be scanned over a build surface. The path across the build surface that each laser beam takes is referred to herein as the laser beam path, or simply the beam path. Without wishing to be bound by theory, there may be a relationship between laser beam paths during printing and any residual stress and/or distortion within the printed part. For example, repeating the same laser beam path on each layer may be associated with anisotropic distortion of the printed part, which may result in unpredictable distortion, failures during the build process, and/or other undesirable outcomes.

As such, it may be beneficial to be able to control the shape of the laser beam paths, both to enable different laser beam paths on different layers as well as to allow complex laser beam paths within a single layer. Benefits of controlling the shape of the laser beam path may include reduced peak distortion and destructive interference, potentially decreasing overall distortion in the printed part. Additionally, controlling the shape of the laser beam path may produce a more isotropic part.

However, there may be challenges associated with controlling the shape of a laser beam path. These challenges may be more apparent in examples when a laser beam spot is not axisymmetric. Specifically, scanning a non-axisymmetric beam, or a non-axisymmetric array of beams, in different directions may be associated with different amounts of energy being delivered to different areas of a build surface for a constant laser power and scan speed. For example, consider a single rectangular "spot" that is twice as wide as it is long. If this beam spot translates in a first direction perpendicular to its width at a given speed, each area on the build surface that is scanned by the spot may receive a first amount of energy. If instead this beam spot translates in a second direction perpendicular to its length at the same given speed, each area on the build surface that is scanned by the spot may receive a second amount of energy that may be twice the first amount of energy due to the exposure time to the laser energy being doubled for each location. In addition to these energy concerns, a width of the resulting beam path after scanning in the first direction may be larger than the width of the resulting beam path after scanning in the second direction due to the projected areas of the beam paths being different for different scanning directions.

In view of the challenges of translating a non-axisymmetric spot (or spots), it may appear appropriate to rotate the laser beam spot as the spot translates, such that the width of the beam path remains constant and the amount of energy delivered to each point scanned by the spot remains constant. Rotating a laser beam spot may include rotating a laser energy source, or rotating an entire laser assembly that includes one or more laser energy sources. However, when rotating a laser assembly, registering the rotational motion and measuring the precise position may be challenging and may result in errors. Depending in part on the aspect ratio of the laser assembly, any small measurement discrepancy may result in a large error in the final positioning of the ends of the laser assembly once rotated.

In view of the above, the Inventors have recognized and appreciated the benefits of controlling the shape and/or the energy of laser beam paths by controlling the angle of translation of the pattern of laser beams emitted by a laser assembly relative to a build surface. In some embodiments, controlling a scan angle may include controlling a scan direction of a laser assembly relative to a reference dimension of the laser assembly. In conventional additive manufacturing processes, a laser assembly may include a linear array of lasers that may be constrained to travel in a single direction. For example, if a laser assembly includes a linear array of lasers extending along a width of a build surface, the laser assembly may be constrained to travel in a direction perpendicular to the width of the build surface. In an additive manufacturing process that allows control of the shapes of the laser beam paths, a laser assembly may be able to translate the emitted laser beams at any desired angle over the build surface relative to a reference dimension of the laser assembly (e.g., the width of a laser array). Such control of the scan angle of the laser assembly is generally referred to herein as angled scanning.

In some embodiments, a scan angle may include an angular difference between a direction of travel of a laser assembly and a direction perpendicular to a width of the laser assembly. Consider for example a laser assembly comprising a linear array of n lasers extending across a width of the laser assembly. A scan angle of 0° may correspond to scanning the laser assembly in a direction perpendicular to its width, such that n separate weld tracks (depending on a spacing of the lasers) may be formed. At another extreme, a scan angle of 90° may correspond to scanning the laser assembly in a direction parallel to its width, such that a single weld track is formed. When scanning at 90°, certain areas of the build surface may receive up to n times the amount of energy compared to certain areas of the build surface when scanning at 0° with similar laser powers and scan speeds, which may be associated with different laser beam paths overlapping. Generally, there may be a relationship between the scan angle of a laser assembly and the amount of overlap of (and, therefore, the amount of energy delivered by) different laser beam paths. Without wishing to be bound by theory, as the scan angle increases from 0° to 90°, an amount of energy applied to a given area of the build surface may increase, and a total area of the build surface scanned by the beam path(s) may decrease.

In view of the challenges associated with unequal energy distributions based at least in part on scan angle, the Inventors have recognized and appreciated that the distribution of energy on the build surface may be made more consistent during angled scanning by adjusting the energy profiles of the laser in the laser assembly. That is, the non-uniform energy distribution on the build surface that may result from angled scanning may be predicted and compensated for by adjusting the laser energy profiles. In the example of a linear array of multiple lasers, the areas of the build surface that may be scanned by more than one laser may receive a higher energy input than the areas of the build surface that may be scanned by a single laser. By reducing the amount of energy delivered by each laser in the areas scanned by multiple lasers, a more consistent energy distribution may be achieved. Additionally, scanning an area with more than one laser may enable melting of material that may be unable to be melted with just the power output of a single laser.

Without wishing to be bound by theory, translating a non-axisymmetric spot (or a plurality of spots) in different directions may result in a trade-off between an amount of energy delivered to each area scanned by the spot and a width of a resulting beam path. Correspondingly, there may be a trade-off between the amount of material processed and the energy density delivered to that material, based at least in part on scan angle. At one extreme, a first scan angle may yield a maximal amount of material processed with a first small range of achievable energy densities. At another extreme, a second scan angle may yield a minimal amount of material processed with a maximum range of achievable energy densities. The first scan angle may be desirable to enable the processing of more material at a higher rate. The second scan angle may be desirable to enable melting of material that may not receive enough energy to be melted if scanned at the first scan angle with a lower energy density. That is, a material that may need more energy than can be delivered by a single laser to melt may be melted by translating a laser assembly that includes a plurality of lasers at a scan angle that allows multiple lasers to deliver energy to the same area. Of course, by scanning at angles between the first and second scan angles, different combinations of an amount of material processed and a delivered energy density beyond these extreme cases are possible. This ability to tailor laser spot energy density and laser beam path dimensions may have numerous benefits, including better control of a melt pool, as discussed further below.

In view of the above, the Inventors have recognized the benefits associated with a method of controlling operation of an additive manufacturing system using a desired energy density and scan angle to control one or more operating parameters of the system. For example, a desired energy density to be delivered to one or more portions of a build surface and a scan angle may either be determined separately. Alternatively, in some embodiments, a scan angle may be determined at least partly on the desired energy density as detailed below. The one or more laser energy sources of the laser assembly may then be selectively activated based, at least in part, on the desired energy density and desired scan angle as the one or more laser energy sources are translated relative to the build surface corresponding in a direction corresponding to the desired scan angle.

The Inventors have also recognized the benefits associated with controlling melt pool spacing when operating a laser assembly at different scan angles. For instance, in some embodiments, a method of controlling melt pool spacing in an additive manufacturing process may include determining a desired melt pool spacing and scan angle of the one or more laser energy sources of a laser assembly. Multiple separate portions of the laser energy sources may then be activated to form separate spaced apart melt pools on the build surface. The specific activation and operation of the laser energy sources may be based, at least in part, on the desired melt pool spacing and the desired scan angle to provide the spaced apart melt pools on the build surface with the desired melt pool spacing. Once the spaced apart melt pools are formed, the laser energy sources may be translated in a direction relative to the build surface corresponding to the desired scan angle. It should be appreciated that in some embodiments, the melt pools may not be formed prior to translation of the laser energy sources, but may form during translation of the laser energy sources. Melt pool spacings can be specified through a combination of specified laser energy source(s) with respective laser energy densities and scan speeds relative to the angle of translation of the laser energy source(s).

In some embodiments, an additive manufacturing system may include a laser assembly. A laser assembly may include one or more laser energy sources (also referred to herein as lasers). Each laser energy source may emit a laser beam toward a build surface. Each laser beam may contact the build surface at a laser beam spot.

As noted above, in some embodiments, a laser assembly may include one or more lasers that produce one or more non-axisymmetric spots. A non-axisymmetric spot may include a rectangular spot, an elliptical spot, a laser beam line, or any other non-axisymmetric shape. In yet other embodiments, a laser assembly may include a plurality of lasers that produce a plurality of spots which may be arranged in a non-axisymmetric arrangement regardless of whether each spot may be axisymmetric or not. In either of these embodiments (i.e., either a single non-axisymmetric spot or a plurality of spots arranged in a non-axisymmetric arrangement), translating the one or more spot(s) at different scan angles may produce beam paths with different energy distribution profiles. Without wishing to be bound by theory, translations in different directions may result in different degrees of overlap between different beam paths or between portions of the same beam path.

In some embodiments, a laser assembly may include one or more laser energy sources arranged in an array. An array may include a rectangular, linear, hexagonal, or any other appropriate array arrangement. An array may include a repeated pattern, which may be a continuous pattern or a discontinuous pattern. In some embodiments, adjacent lasers of an array may be in contact, while in other embodiments adjacent lasers may be spaced apart. In some embodiments, a laser assembly may include a plurality of lasers not arranged in an array. Thus, it should be appreciated that a laser assembly may include any suitable number of lasers disposed in any suitable arrangement, as the disclosure is not limited in this regard.

In some embodiments, a laser assembly may emit laser beams at a predefined angle relative to the laser assembly. In such embodiments, a laser beam may trace a path on a build surface due to relative motion of the laser assembly and the build surface. The relative motion may be due to motion of the laser assembly relative to a stationary build surface, motion of a build surface relative to a stationary laser assembly, or motion of both the laser assembly and the build surface relative to a fixed external reference point, as the disclosure is not limited in this regard. In such an embodiment, the laser assembly may be integrated into an optics head. In other embodiments, both the laser assembly and the build surface may remain stationary relative to one another, and the angle of the laser beams relative to the laser assembly may be dynamically adjusted to trace a path on the build surface using any appropriate control method. In such embodiments, one or more optical components, such as a laser galvanometer, solid state scanning, or any other appropriate component capable of controlling the relative motion of a laser beam on a build surface may be used. In yet other embodiments, a combination of the above control methods may be used. Accordingly, it should be appreciated that any suitable method of controlling the relative motion of the one or more laser beams over a build surface may be used as the disclosure is not limited in this regard.

In some embodiments, a scan angle may be based at least in part on a spacing of lasers within a laser assembly. Different laser spacings within a laser assembly may be associated with different degrees of laser beam path overlap, even for the same scan angle. Without wishing to be bound by theory, lasers spaced more closely together may be associated with more beam path overlap for a given scan angle compared to lasers spaced farther apart.

In some embodiments, a spacing of laser beam spots on a build surface may be adjusted. For example, adjusting a spacing of laser beam spots on a build surface may include adjusting a spacing of lasers within a laser assembly (e.g., one or more lasers may be translated in one or more directions to adjust a spacing between the lasers). Alternatively, a spacing of laser beam spots on a build surface may be adjusted without adjusting a spacing of lasers within a laser assembly. For example, one or more lenses of an optical assembly may be adjusted to adjust a spacing of laser beam spots on a build surface without adjusting a spacing of lasers within an assembly (e.g., adjusting a position of one or more lenses relative to one or more lasers of a laser assembly may adjust a relative spacing of laser beam spots on a build surface). It should be appreciated that adjusting a spacing of laser beam spots on a build surface may include making any suitable adjustment to one or more mechanical and/or optical assemblies associated with one or more lasers, as the disclosure is not limited in this regard. Examples of suitable adjustments to mechanical and/or optical assemblies associated with one or more lasers include but are not limited to: adjusting a position and/or orientation of one or more lenses, adjusting a position and/or orientation of one or more mirrors, and adjusting a position and/or orientation of one or more lasers. In some embodiments, a relative spacing of all laser beam spots on a build surface may be adjusted simultaneously and/or in a coordinated fashion, while in some embodiments a spacing of each laser beam spot on a build surface may be adjusted individually.

Adjusting a spacing of laser beam spots on a build surface may be desirable, for example, if a desired scan angle and a desired energy density may not be achievable with a current spacing of laser beam spots. For example, in a first configuration, laser beam spots may be relatively closely spaced, such that scanning at a desired scan angle may be associated with delivering an energy density above a desired energy density. If, in a second configuration, the spacing of laser beam spots is adjusted such that the laser beam spots are spread farther apart as compared to the first configuration, scanning at the desired scan angle may be associated with delivering the desired energy density. As another example, in a first configuration, laser beam spots may be relatively closely spaced when scanned in a predetermined direction, such that delivering a desired power with each laser beam may be associated with delivering an energy density to the build surface above a desired energy density. However, in a second configuration, the spacing of laser beam spots may be adjusted such that the laser beam spots are spread farther apart as compared to the first configuration when the laser beam spots are scanned in the predetermined direction. By increasing a spacing between the spots in combination with the scan direction and power provided by each laser beam, a processor of the system may control the system such that it delivers the desired energy density to the build surface. Accordingly, in some embodiments, a spacing of laser beam spots on a build surface may be adjusted based, at least in part, on a desired scan angle and/or a desired energy density. In some embodiments, the spacing of laser beam spots may be adjusted from one pass to the next. For example, a spacing of laser beam spots may be adjusted based, at least in part, on a first desired scan angle and/or a first desired energy density associated with a first pass, and may again be adjusted based, at least in part, on a second desired scan angle and/or a second desired energy density associated with a second pass. Of course, other rationales for adjusting a spacing of laser beam spots on a build surface may be appropriate, and the present disclosure is not limited in this regard. In view of the above, in some embodiments, a spacing of the laser beams spots on the build surface, a power associated with the laser beams, and the desired scan angle may be used by an associated processor, or other controller, to determine and provide a desired energy density to the build surface.

As described above, it may be desirable in some cases to change a scan angle from one pass of an additive manufacturing process to the next pass. In some embodiments, a scan angle on a first pass may be different from a scan angle on a second, or other subsequent, pass. The scan angle of a second pass may be based, at least in part, on the scan angle of a first pass. A difference in scan angle between sequential passes may be between or equal to any appropriate combination of −179°, −150°, −135°, −120°, −90°, −60°, −45°, −30°, −1°, 1°, 30°, 45°, 60°, 90°, 120°, 135°, 150°, 179°, and/or any other appropriate angle. In some specific embodiments, a difference in the scan angle of sequential passes may be between or equal to 60° and 120°, approximately 90° (i.e. sequential scans may be substantially perpendicular), though other combinations of the forgoing are contemplated. For example, a first pass may include a scan angle of +45°, and a second pass may include a scan angle of −45°. As another example, a first pass may include a scan angle of +60°, and a second pass may include a scan angle of −30°. Of course, any pass may be done using any desired scan angle and any appropriate difference in the scan angle between sequential passes may be used as the disclosure is not limited to any of the specific relationships noted above.

In some embodiments, it may be desirable to avoid scanning in the same directions repeatedly during a build process. Thus, in some embodiments an actual commanded scan angle may include a small deviation, such as a dither, around a nominal commanded scan angle. A dither may be in either direction relative to the nominal commanded scan angle. In some embodiments, an absolute value of a dither may be greater than or equal to 1°, 2°, 3°,4°, 5°, 6°, 7°, 8°, 9°, and/or any other appropriate magnitude. An absolute value of a dither may also be less than or equal to 10°, 9°, 8°, 7°, 6°, 5°, 4°, 3°, 2°, and/or any other appropriate magnitude. Combinations of the above noted ranges are contemplated including, for example, a dither between or equal to −10° and +10°. Other suitable dithers both greater and less than those noted above are contemplated as the disclosure is not limited in this regard. During operation, a magnitude of a dither may be applied using either a randomly determined dither magnitude within the desired dither range, the dither may be systematically varied during operation, and/or any other desired method of applying a dither to the commanded scan angle may be implemented as the disclosure is not limited to how a dither is implemented.

In some embodiments, lasers may melt powder on a build surface to form one or more melt pools. In some embodiments, each activated laser may form its own melt pool. In some embodiments, the number of melt pools may be less than the number of activated lasers. That is, melt pools may grow and coalesce such that multiple lasers contribute energy to a single melt pool. Without wishing to be bound by theory, a spacing between the one or more melt pools may be different than a spacing between the one or more lasers that formed the one or more melt pools, due in part to factors such as surface tension of the liquid metal. During angled scanning, the spacing of laser beam paths on the build surface may be associated with the scan angle. Correspondingly, the spacing of the melt pools may be associated with the scan angle. In some embodiments, a scan angle may be determined, at least in part, on a desired melt pool spacing. In some embodiments, a melt pool spacing may be greater than 50 μm, 100 μm, 500 μm, 1 mm, or any other appropriate spacing. In some embodiments, a melt pool spacing may also be less than 50 mm, 10 mm, 5 mm, 1 mm. Combinations of the foregoing melt pool spacings are contemplated including a melt pool spacing that is between or equal to 50 μm and 50 mm. Of course, other suitable melt pool spacings both greater and less than those noted above are possible as the disclosure is not limited in this regard.

As described above, a spacing of laser beam spots on a build surface may be adjusted. In some embodiments, a spacing of laser beam spots on a build surface may be adjusted based, at least in part, on a desired melt pool spacing. For example, if scanning with a first spacing of laser beam spots (e.g., a close spacing) using other desired parameters (e.g., desired scan angle, desired energy density) might result in separate melt pools (undesirably) combining into a single melt pool, the spacing of laser beam spots may be adjusted to a second spacing (e.g., a more disperse spacing) such that the separate melt pools remain separate. Accordingly, in some embodiments, a spacing of laser beam spots on a build surface may be adjusted based, at least in part, on a desired melt pool spacing, a desired scan angle, and/or a desired energy density. In view of the above, in some embodiments, a spacing of the laser beams spots on the build surface, a power associated with the laser beams, and the desired scan angle may be used by an associated processor, or other controller, to determine and provide a desired melt pool spacing to the build surface.

In some embodiments of an additive manufacturing process, multiple melt pools may be formed. Different parameters may be selected to control different melt pool properties. For example, an energy density applied to the build surface and/or a translation speed of a laser energy source may be selected such that the path of a first melt pool may be adjacent to a path of a second melt pool along the build surface. Parameters may be chosen appropriately to ensure that the first melt pool solidifies before the second melt pool reaches the first melt pool, if desired.

For the sake of clarity, the embodiments described herein are scanned at angles defined relative to a width of a laser assembly. However, it should be understood that a scan angle for the various embodiments described herein may be defined relative to any appropriate reference dimension, plane, or other appropriate feature of a laser assembly as the disclosure is not limited in this fashion. For purposes of this disclosure a width of a laser assembly may be defined as a maximum transverse dimension of the laser assembly in a plane parallel to a plane of the associated build surface. For example, a laser assembly that includes a linear array of lasers may have a width associated with a direction in which the lasers are aligned. In some embodiments, a laser assembly may include a symmetric arrangement of lasers, and/or the laser assembly may not have a single, maximum transverse dimension. In these embodiments, any other appropriate directional reference relative to the laser assembly may be used to define a scan angle of the laser assembly as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-1D depict one embodiment of an additive manufacturing system in which a single laser of a laser assembly is activated. In the front view of FIG. 1A, an additive manufacturing system 100 includes a build surface 102 and a laser assembly 104. The laser assembly 104 includes one or more laser energy sources 106 (also referred to herein as lasers). The additive manufacturing system 100 additionally includes a processor 120 including associated memory storing processor executable instructions to perform the methods described herein. The processor is operatively coupled to the one or more lasers 106. One of the lasers 106 is activated to produce a laser beam 108.

Figure 1B:
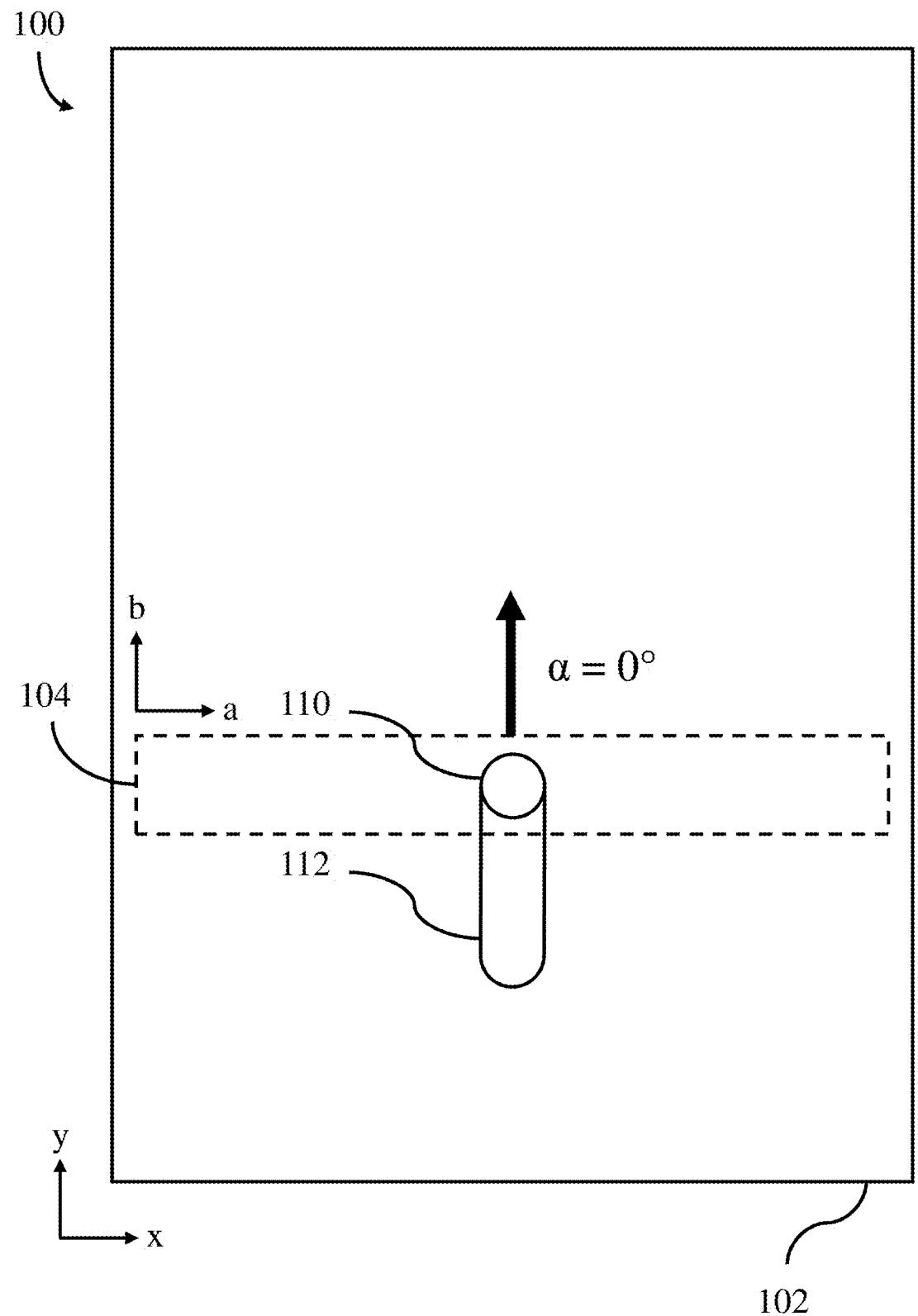
FIG. 1B is a top view of the embodiment of the additive manufacturing system shown in FIG. 1A, in which the laser assembly scans in a direction perpendicular to its width.

In the top view of FIG. 1B, the laser assembly 104 scans across the build surface 102 in a direction perpendicular to the width of the laser assembly, indicated by the large arrow. In the embodiment of the figure, a width of the build surface 102 lies along the x-axis, and a length of the build surface 102 lies along the y-axis. Similarly, a width of the laser assembly 104 lies along the a-axis, and a length of the laser assembly 104 lies along the b-axis. In this embodiment, the width of the laser assembly 104 (a-axis) is parallel to the width of the build surface (x-axis). The laser beam 108 contacts the build surface 102 to make a laser beam spot 110. As the laser assembly 104 translates across the build surface 102, the spot 110 leaves a laser beam path 112 on the build surface 102. The scan angle α is defined as the deviation of the scan direction (indicated by the large arrow) from a direction perpendicular to the width of the laser assembly 104 (i.e., the b-axis). In the embodiment of FIG. 1B, the scan angle α is 0°, as the direction of travel of the laser assembly 104 is parallel to the b-axis. It should be appreciated that the scan angle of the laser beam across the build surface may be implemented in any appropriate fashion. For example, an optical head including a plurality of lasers may be scanned across the build surface in the desired direction, galvanometer controls may be used to scan the lasers along the desired scan directions in a desired layout, the build surface may be moved beneath a stationary optical head, combinations of the forgoing, and/or any other appropriate method may be used to control the direction of travel of the lasers relative to the build surface.

Figure 1C:
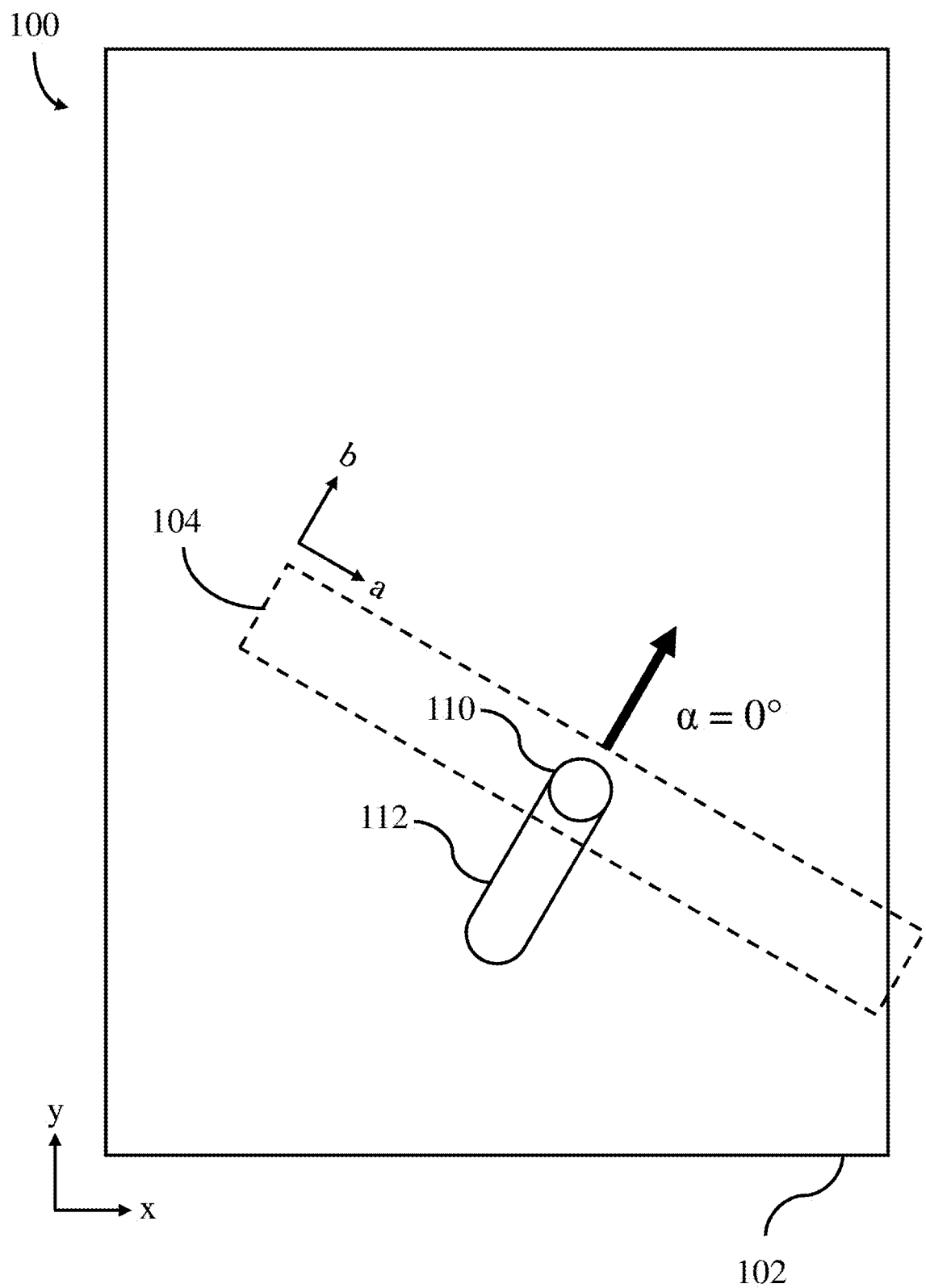
FIG. 1C is a top view of the embodiment of the additive manufacturing system shown in FIG. 1A, in which the laser assembly scans in a direction perpendicular to its width after rotating.

FIG. 1C is a top view of the embodiment of the additive manufacturing system shown in FIG. 1A, in which the laser assembly 104 scans the one or more laser beams in a direction perpendicular to its width after rotating relative to the build surface 102. Because the laser assembly 104 still translates in the same direction relative to a direction perpendicular to its width (i.e., the laser assembly 104 still translates along the b-axis), the scan angle α is also 0° in this case. It should be appreciated that this translation direction is different relative to the build surface 102, as the b-axis and the y-axis are no longer aligned after the laser assembly 104 is rotated. However, as noted previously, this physical rotation of the laser assembly relative to the build surface may either be difficult to implement and/or introduce errors into the control of the system.

Figure 1D:
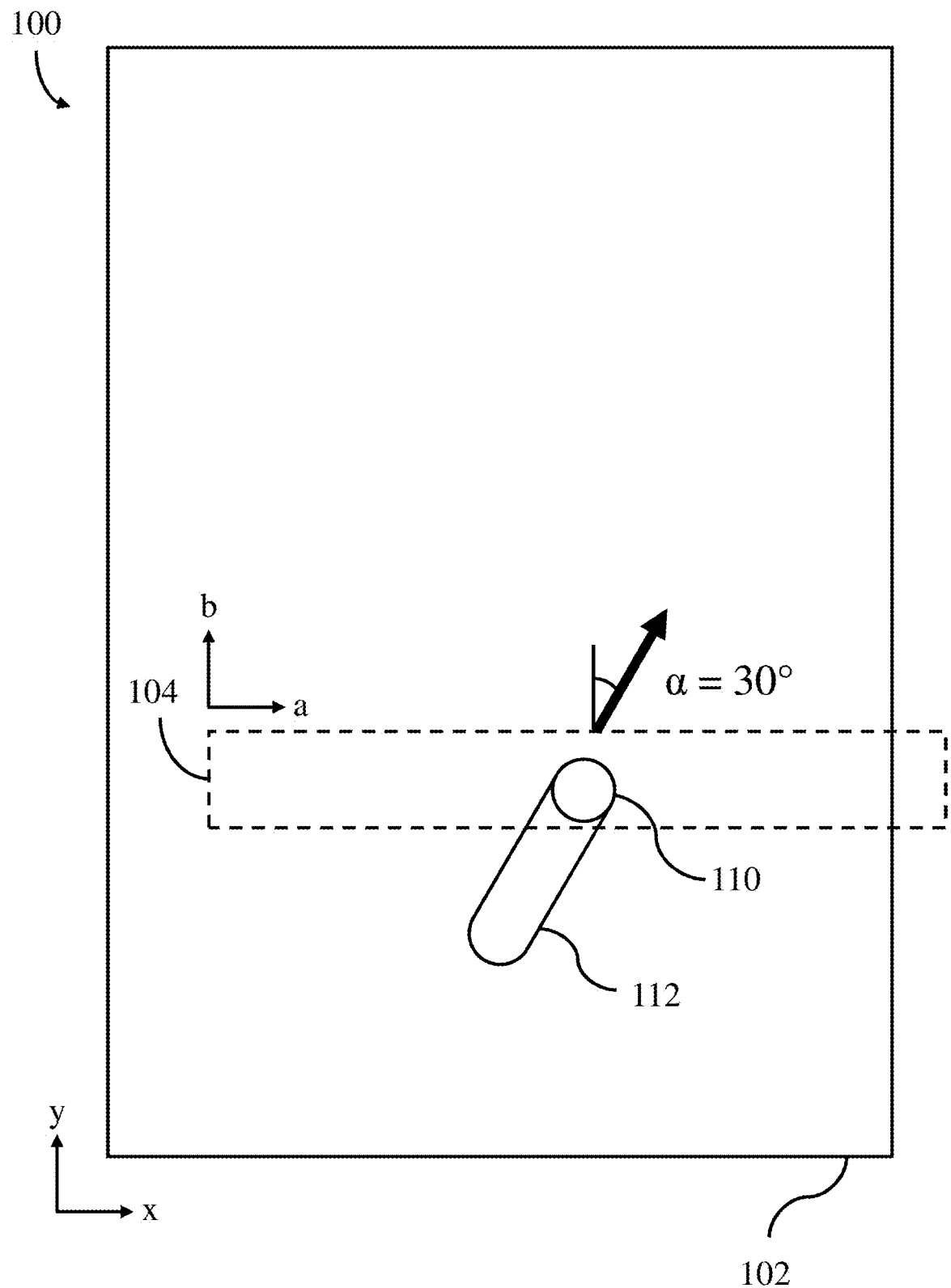
FIG. 1D is a top view of the embodiment of the additive manufacturing system shown in FIG. 1A, in which the laser assembly scans at a non-perpendicular angle relative to the width of the laser assembly.

FIG. 1D is a top view of the embodiment of the additive manufacturing system shown in FIG. 1A, in which the laser assembly 104 is controlled to translate the laser beams on the build surface at an angle relative to a direction perpendicular to a width of the laser assembly. That is, the laser assembly 104 is controlled to translate the laser beams at an angle relative to the b-axis. In the embodiment of the figure, the scan angle α is 30°. Of course, it should be appreciated that any scan angle may be chosen, as the disclosure is not limited in this regard. Because the laser beam spot 110 is axisymmetric in the embodiment of the figure, the beam path 112 in FIG. 1D has an energy distribution profile akin to the energy distribution profile of the beam path 112 in FIGS. 1B and 1C. Without wishing to be bound by theory, different scan angles of a single axisymmetric beam spot may not be associated with different energy distribution profiles.

FIGS. 2A-2E show one embodiment of an additive manufacturing system in which a plurality of lasers of a laser assembly are activated with a non-symmetric layout. Referring to the front view of FIG. 2A, a laser assembly 204 includes a plurality of lasers 206. The additive manufacturing system additionally includes a processor 220 including associated memory storing processor executable instructions to perform the methods described herein. The processor is operatively coupled to the one or more lasers. A subset of the lasers 206 are activated, forming laser beams 208. It should be appreciated that the lasers may be disposed in any suitable arrangement, as described above. For example, the activated lasers may be arranged in a linear array, a rectangular array, or a hexagonal array. Each laser may be in contact with one or more adjacent laser, or the lasers may be spaced apart. Any suitable spacing between the lasers and/or the laser beams may be used, as the disclosure is not limited in this regard. In the embodiment of the figure, lasers 206 are arranged in a linear array, and produce laser beam spots 210 (see FIG. 2B) such that adjacent spots 210 are in contact.

Figure 2A:
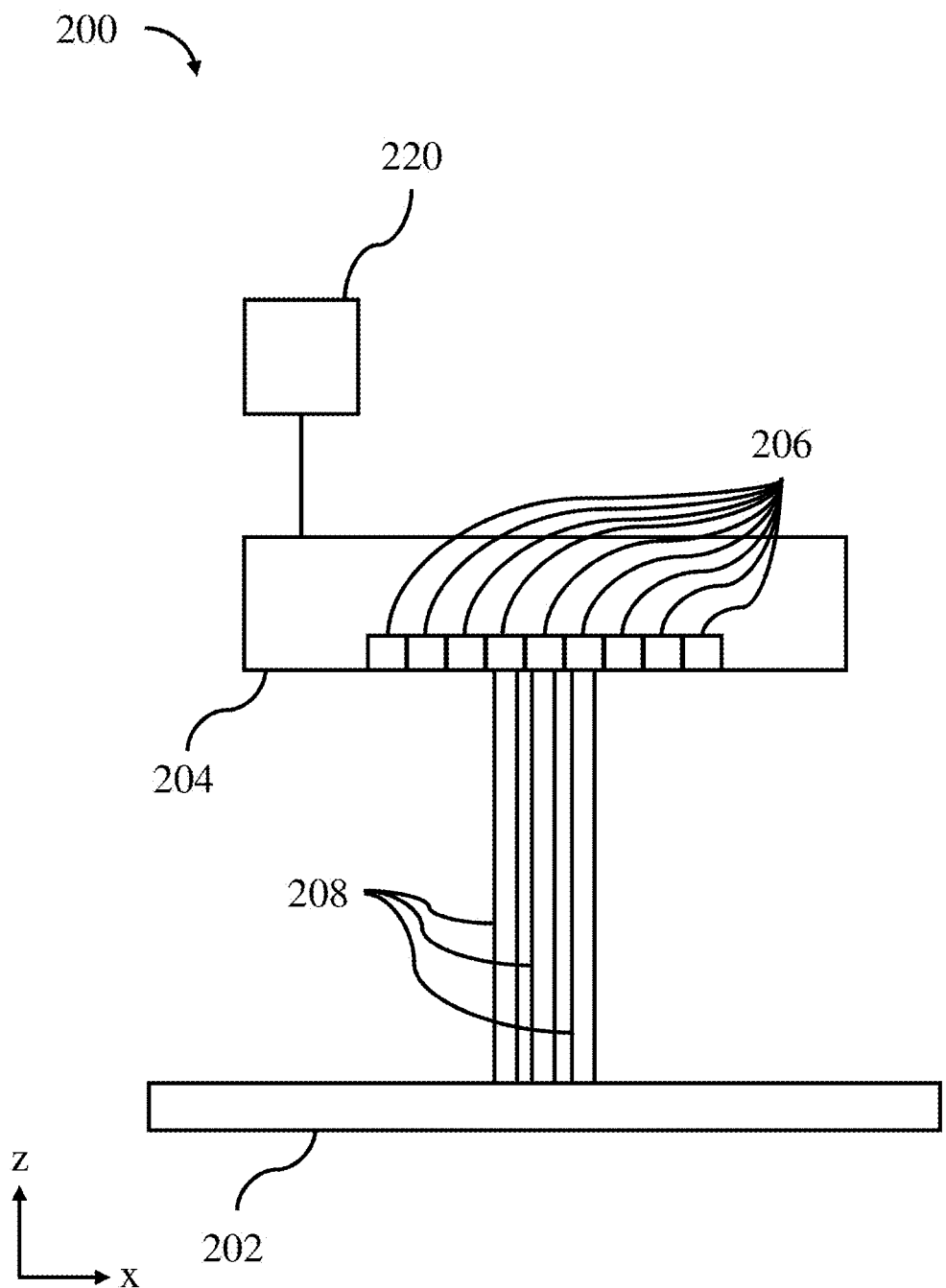
FIG. 2A is a front view of one embodiment of an additive manufacturing system in which a plurality of lasers of a laser assembly are activated.
Figure 2B:
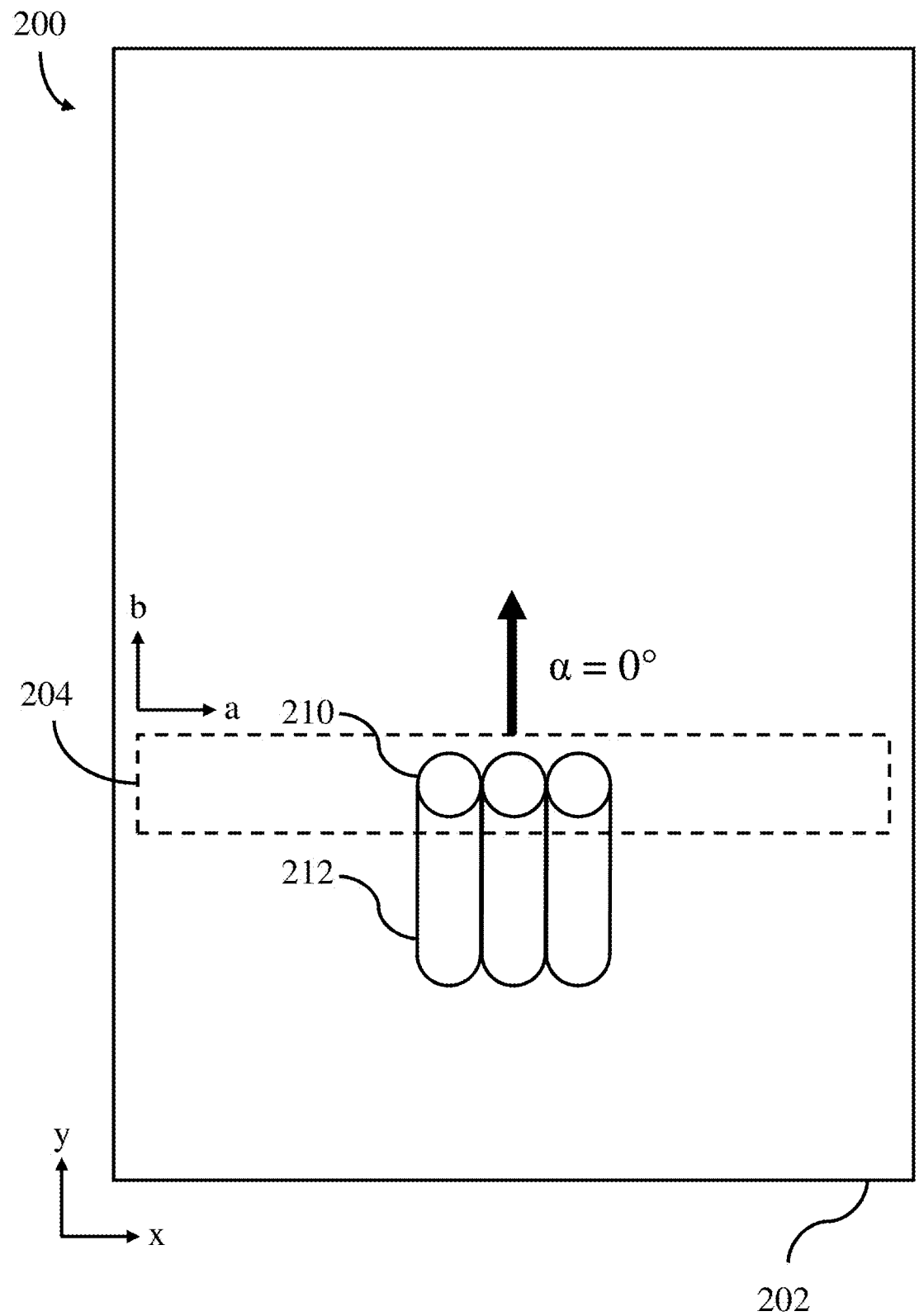
FIG. 2B is a top view of the embodiment of the additive manufacturing system shown in FIG. 2A, in which the laser assembly scans in a direction perpendicular to its width.
Figure 2C:
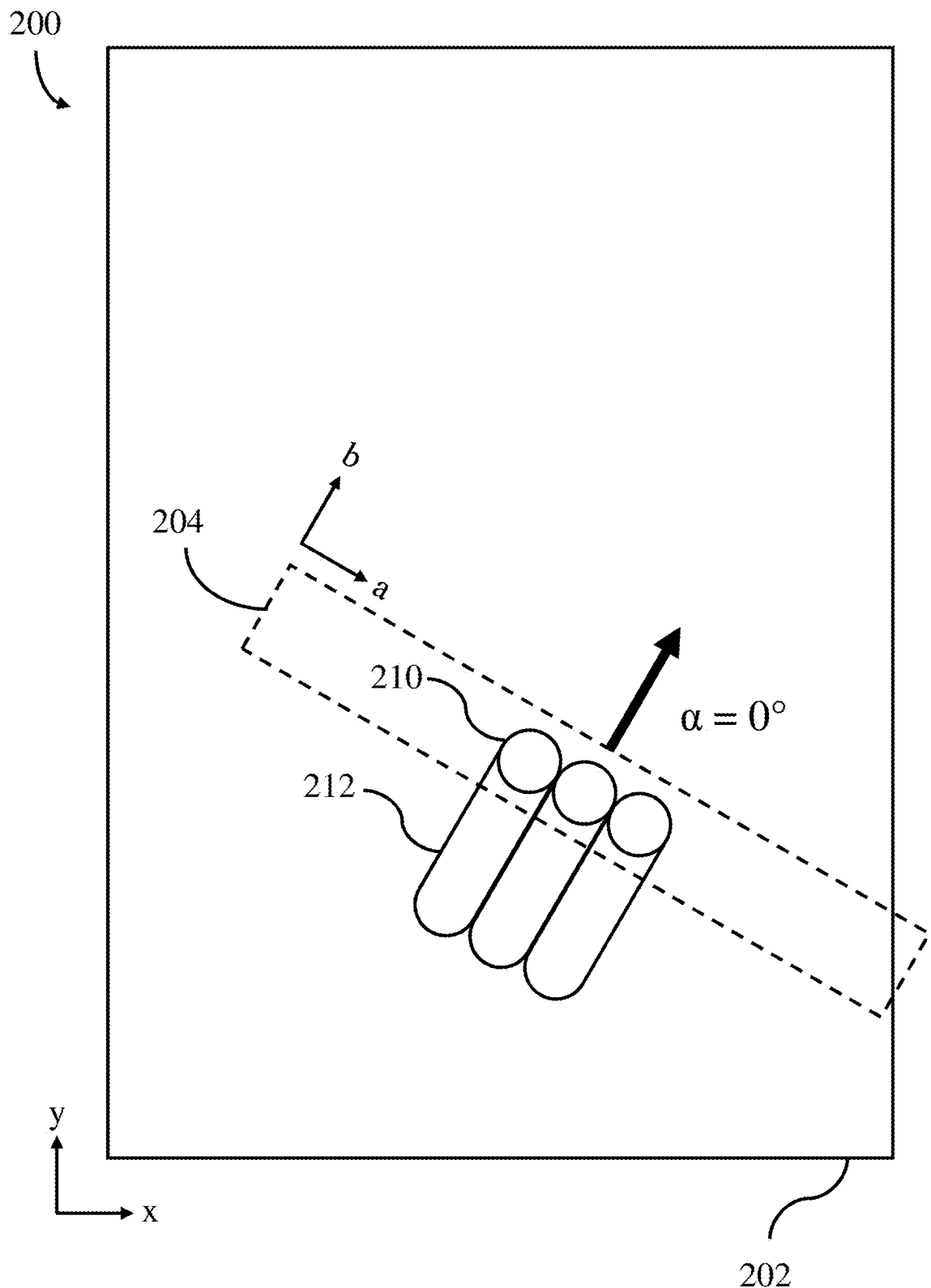
FIG. 2C is a top view of the embodiment of the additive manufacturing system shown in FIG. 2A, in which the laser assembly scans in a direction perpendicular to its width after rotating.
Figure 2D:
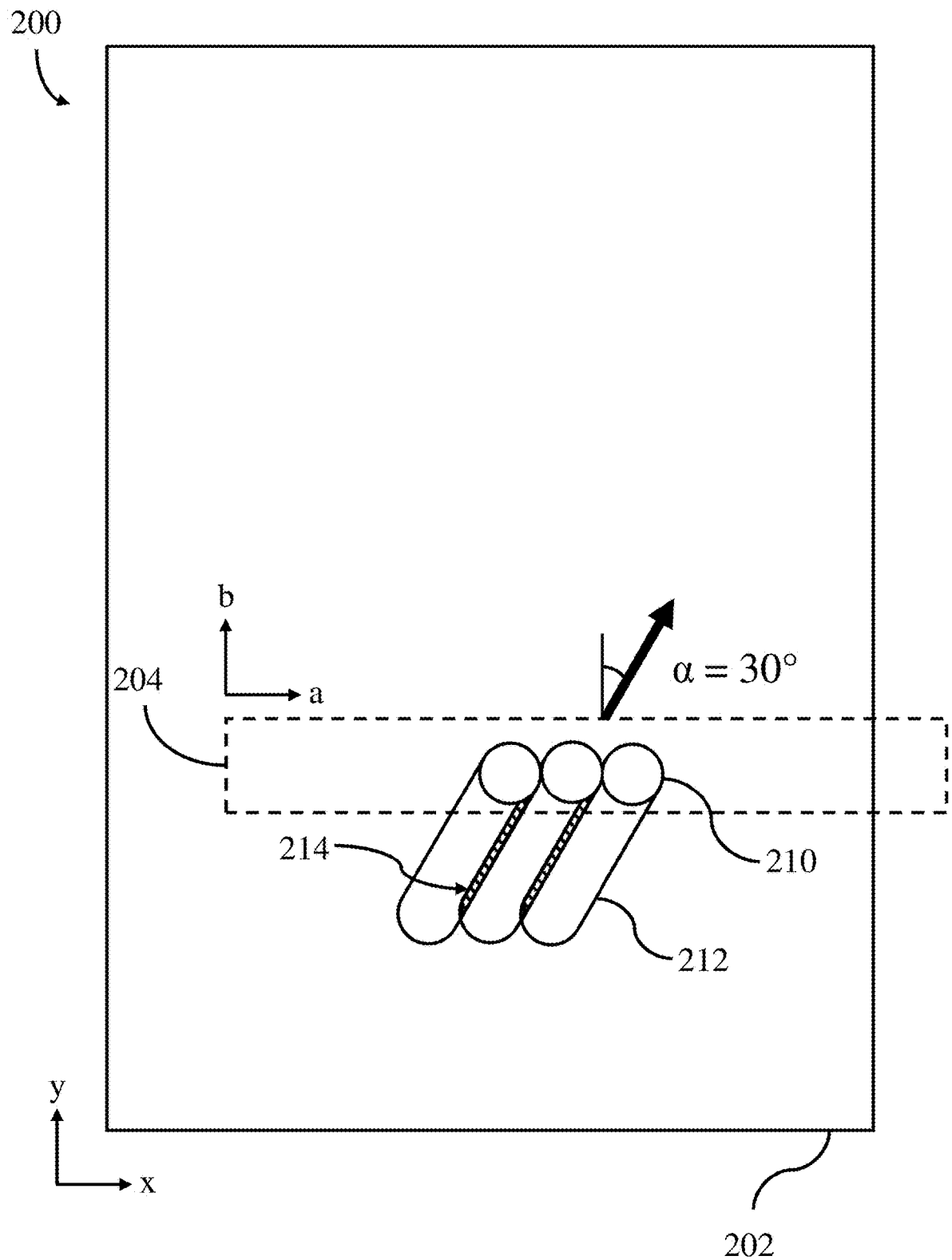
FIG. 2D is a top view of the embodiment of the additive manufacturing system shown in FIG. 2A, in which the laser assembly scans at a first non-perpendicular angle relative to the width of the laser assembly on a first pass.

In the top views of FIGS. 2B and 2C, the laser assembly 204 scans the laser beams across the build surface in a direction perpendicular to its width, in a manner analogous to the description above related to FIGS. 1B and 1C. It should be appreciated that in FIG. 2C, the laser assembly 204 is rotated relative to the build surface 202 prior to scanning. In contrast to FIGS. 2B and 2C, the laser assembly 204 in FIG. 2D translates the laser beams at a scan angle. In this case, the beam paths 212 formed by the beam spots 210 overlap in some areas 214. These areas of overlap 214 may receive more energy from the laser beams compared to portions of the beam paths 212 that do not include any overlap. Without wishing to be bound by theory, knowing the energy distribution profile of each laser beam and the scan angle of the laser assembly (as well as the laser distribution pattern within the laser assembly) may allow calculation of the increased energy that would be delivered to areas where beam paths overlap. Appropriate control of the energy distribution profile, power, and/or other appropriate parameter of the various laser beams may be controlled to tailor the amount of energy delivered to the areas where beam paths overlap, if desired.

It should be appreciated that different spacings of lasers within a laser assembly may be associated with different amounts of overlap of laser beam paths. Additionally, it should be appreciated that different scan angles may be associated with different amounts of overlap of laser beam paths. In some embodiments, a scan angle may be based at least in part on a spacing of lasers within a laser assembly. Different laser spacings within a laser assembly may be associated with different degrees of laser beam path overlap, even for the same scan angle. Without wishing to be bound by theory, lasers spaced more closely together may be associated with more beam path overlap for a given scan angle compared to lasers spaced farther apart. Similarly, different scan angles may be associated with different degrees of laser beam path overlap, even for the same laser spacing. For example a linear array of lasers would exhibit a maximum overlap for a scan direction parallel to a width of the linear array where each pixel is scanned along the same path and no overlap for a scan direction perpendicular to a width of the linear array where each pixel is scanned over separate non-overlapping paths. Without wishing to be bound by theory, a larger scan angle may be associated with more beam path overlap for a given laser spacing compared to a smaller scan angle. Any suitable laser spacing and/or scan angle may be used to generate any desired overlap of laser beam paths, as the disclosure is not limited in this regard. Further, while a linear array has been shown with overlap between the scanned paths of adjacent lasers, two dimensional arrays of lasers are also contemplated where the scan path of one or more trailing lasers disposed behind at least a first set of lasers relative to a scan direction may at least partially overlap the scan paths of the leading lasers. Again the degree of overlap between the scanned paths of the leading and trailing lasers may depend on the specific arrangement of the lasers relative to each other and the specific scan angle.

Figure 2E:
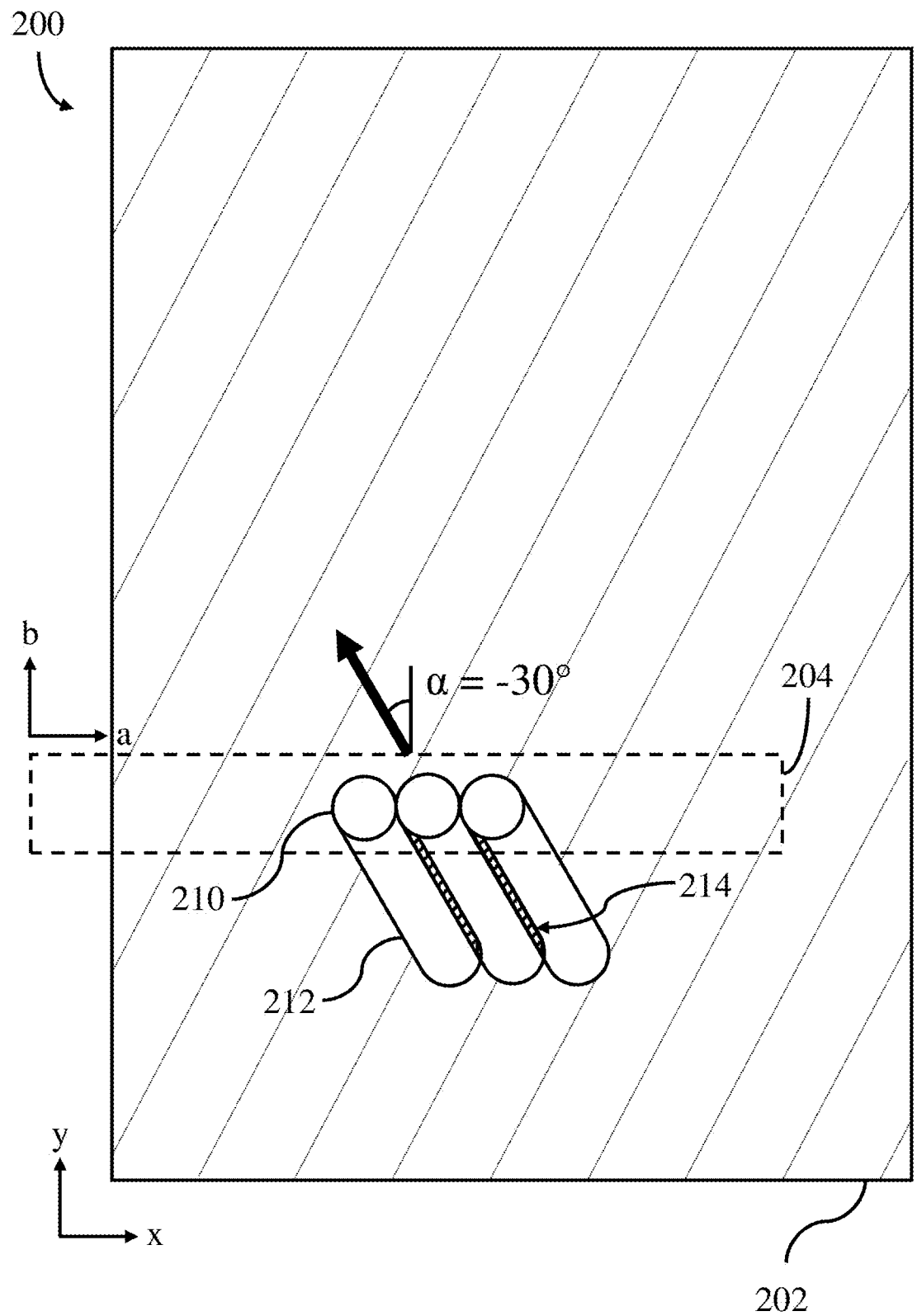
FIG. 2E is a top view of the embodiment of the additive manufacturing system shown in FIG. 2A, in which the laser assembly scans at a second non-perpendicular angle relative to the width of the laser assembly on a second pass.

FIG. 2E shows the laser assembly scanning the laser beams across the build surface at a second angle that is different from the first angle during a second subsequent pass of the laser beams across the build surface. In the embodiment of the figure, the second scan is performed at a scan angle of −30° with a difference of 60° relative to the first scan angle of 30°. However, as described above, employing different scan angles on different passes may be associated with less distortion and a more isotropic part. It should be appreciated that any pass may be performed at any scan angle. Additionally, the scan angle of a first pass may form any desired relationship to a scan angle of a second pass. For example, the scan angles of a first and second pass may differ by ±90°, ±60°, ±45°, ±30°, ±15°, or any other suitable angle. Further, while the use of different scan angles in sequential passes have been described, instances in which the same scan angle is used in sequential passes are also contemplated.

Figure 3A:
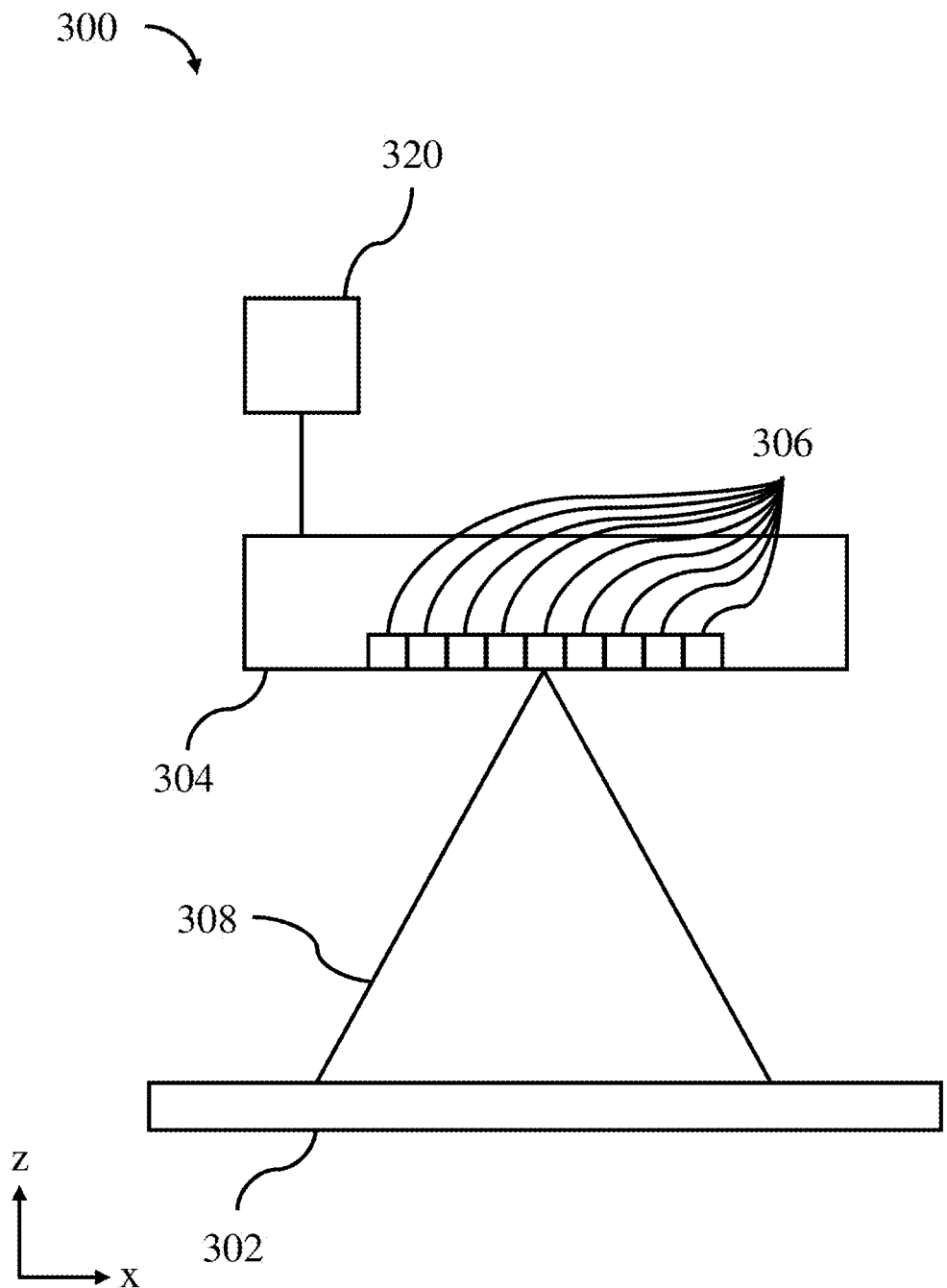
FIG. 3A is a front view of one embodiment of an additive manufacturing system in which a single line laser of a laser assembly is activated.
Figure 3B:
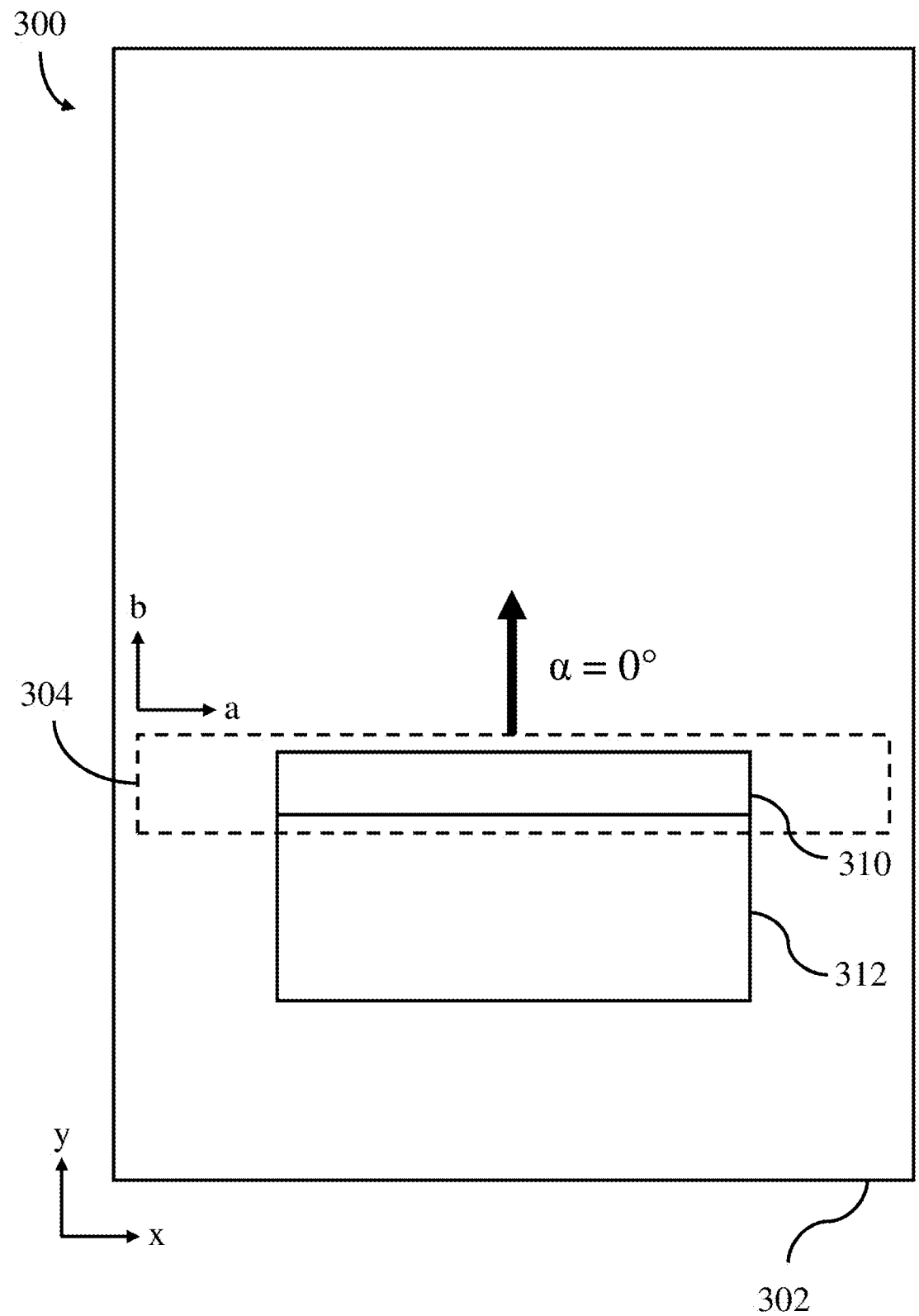
FIG. 3B is a top view of the embodiment of the additive manufacturing system shown in FIG. 3A, in which the laser assembly scans in a direction perpendicular to its width.
Figure 3C:
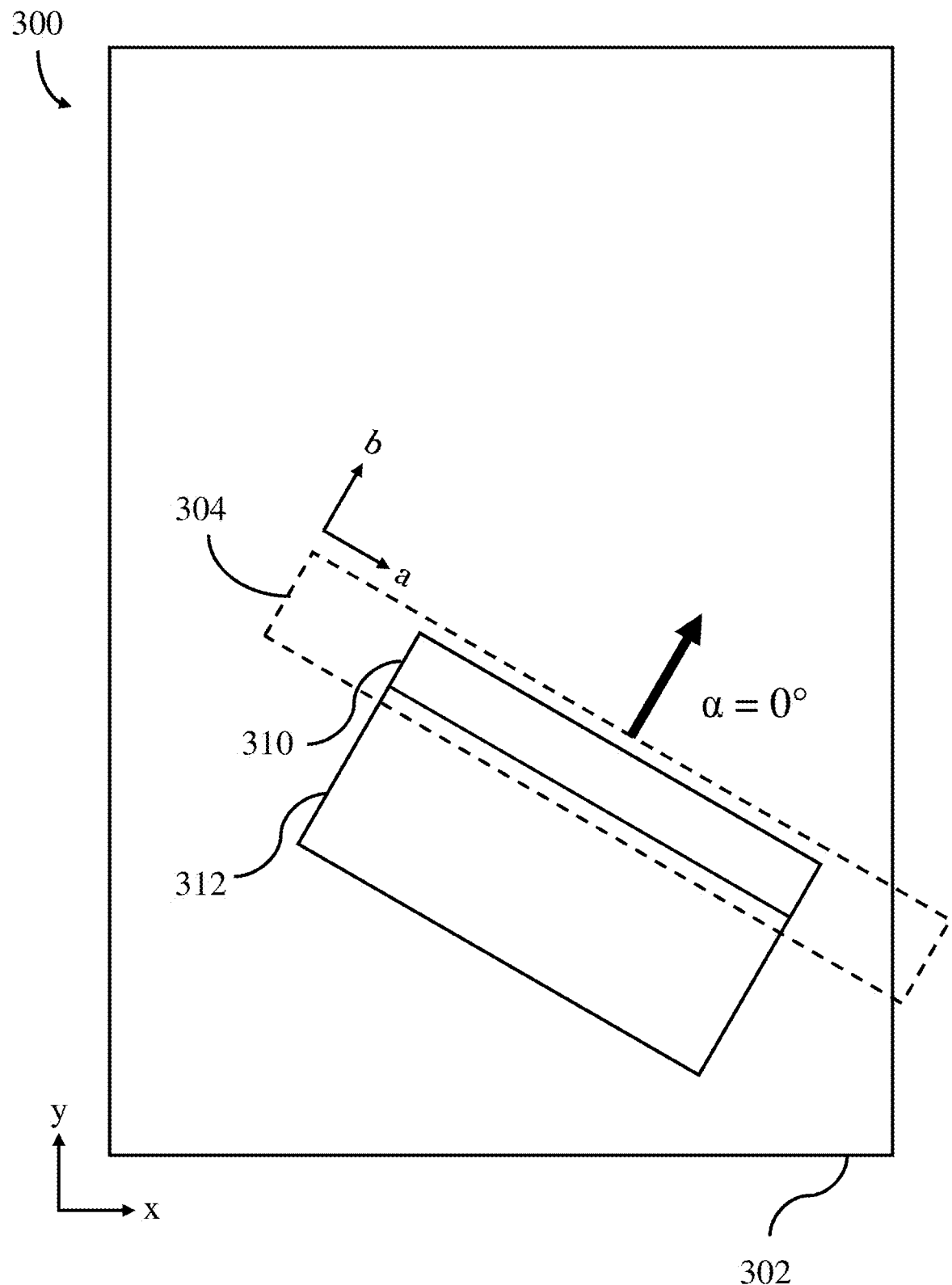
FIG. 3C is a top view of the embodiment of the additive manufacturing system shown in FIG. 3A, in which the laser assembly scans in a direction perpendicular to its width after rotating.
Figure 3D:
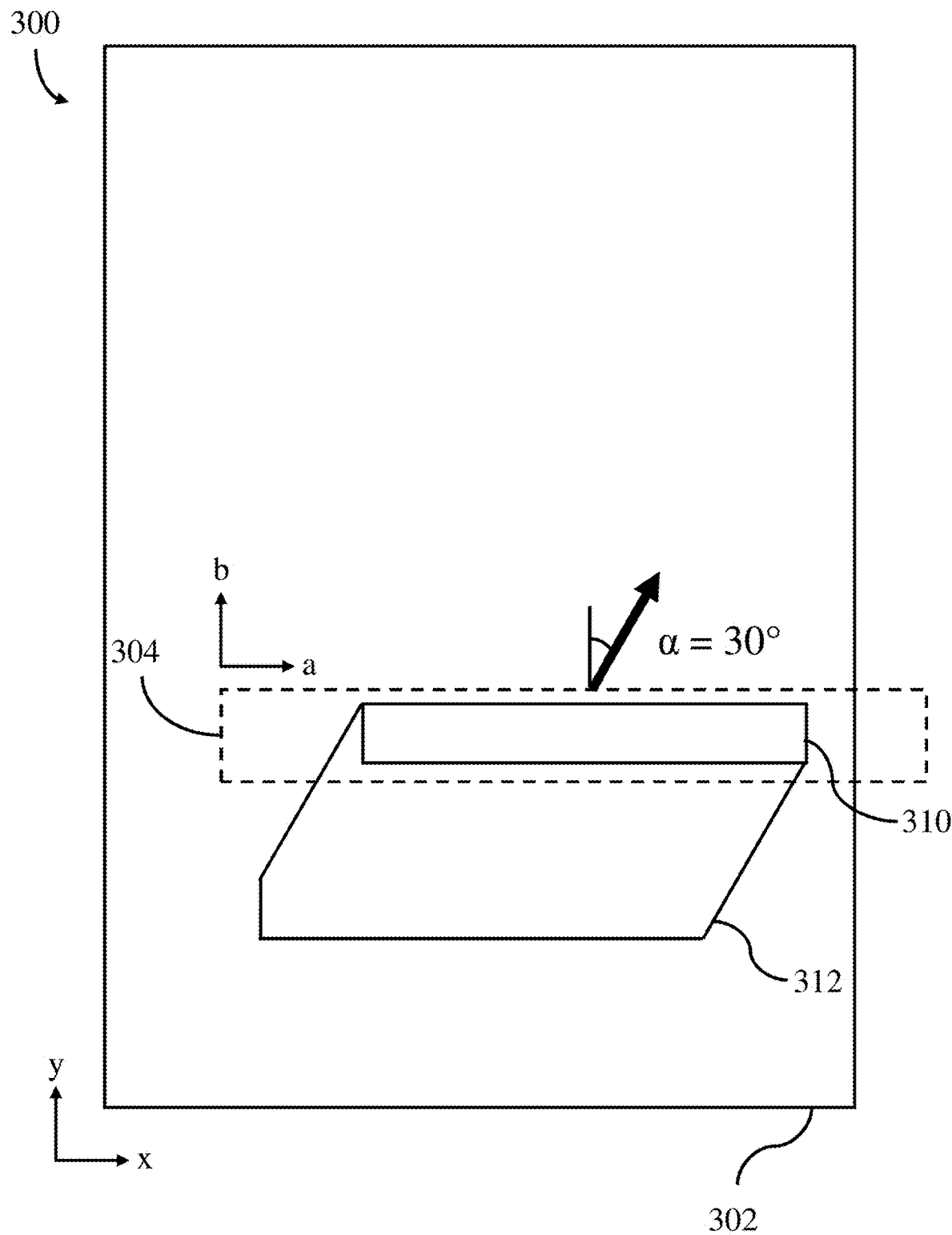
FIG. 3D is a top view of the embodiment of the additive manufacturing system shown in FIG. 3A, in which the laser assembly scans at a first non-perpendicular angle relative to the width of the line laser on a first pass.
Figure 3E:
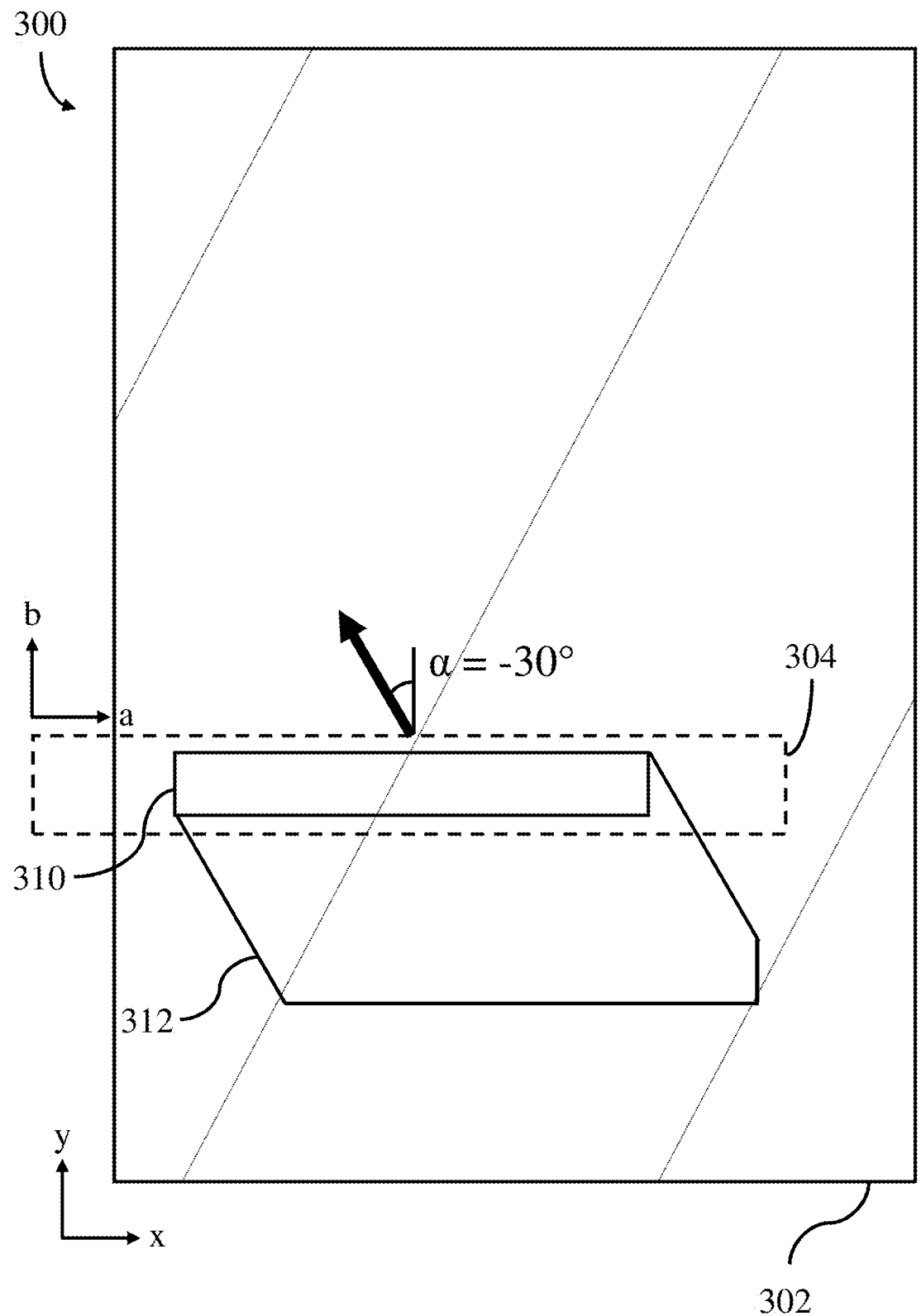
FIG. 3E is a top view of the embodiment of the additive manufacturing system shown in FIG. 3A, in which the laser assembly scans at a second non-perpendicular angle relative to the width of the line laser on a second pass.

FIGS. 3A-3E are analogous to FIGS. 2A-2E, except that the multiple laser beams 208 are substituted for one or more line laser beams 308, and the linear array of laser spots 210 is substituted for one or more laser lines 310. While the energy distribution profiles of the laser line paths 312 may be similar in FIGS. 3B and 3C, the energy distribution profile of the laser line path 312 in FIG. 3D may be appreciably different due to the above-described effects of angled scanning. That is, angled scanning of a single non-axisymmetric laser "spot" (in the embodiments of the figure, the "spot" is better described as a line) may be associated with different energy distribution profiles for different scan angles. In the front view of FIG. 3A, an additive manufacturing system 300 includes a build surface 302 and a laser assembly 304. The laser assembly 304 includes one or more lasers 306. The additive manufacturing system 300 additionally includes a processor 320 including associated memory storing processor executed instructions to perform the methods described herein. The processor is operatively coupled to the one or more lasers 306. One of the lasers 306 is activated to produce a line laser beam 308. In the top views of FIGS. 3B and 3C, the laser assembly 304 scans the line laser beam across the build surface 302 in a direction perpendicular to its width which may correspond to a minimum amount of overlap during a scan. In contrast, the laser assembly 304 in FIG. 3D translates the line laser beam at a non-perpendicular scan angle relative to a width of the line laser beam. In this case, the line path 312 formed by the beam line 310 includes some portions that may receive more energy compared to other portions of the line path 312. FIG. 3E shows the laser assembly 304 scanning the line laser beam 308 across the build surface 302 at a second angle that is different from the first angle during a second subsequent pass of the line laser beam across the build surface.

Figure 4:
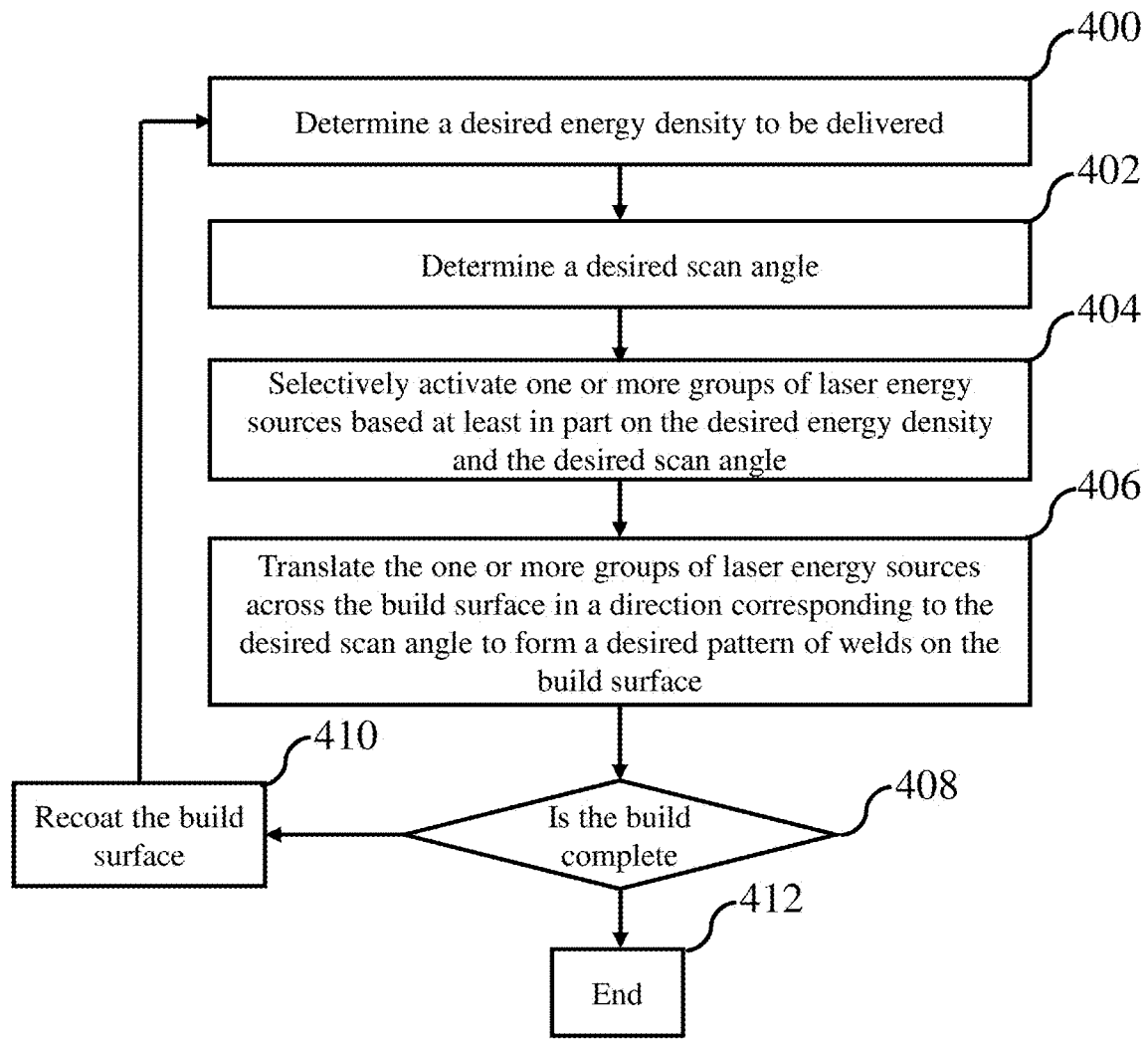
FIG. 4 depicts one embodiment of a method for operating an additive manufacturing system based at least in part on a desired energy density to be delivered.

FIG. 4 depicts one embodiment of a method for operating an additive manufacturing system. At 400, a processor of the system may determine a desired energy density to be delivered to one or more portions of a build surface. A desired energy density may be based at least in part on a desired material processing time, a desired build time, a property of a build material (e.g., a thermal property of a metal powder), a desired melt pool size, a desired melt pool spacing, a desired weld size, and/or any other suitable variable. For example, a larger weld size may be associated with a greater energy density, while a larger melt pool spacing may be associated with a lesser energy density.

After determining a desired energy density, the processor may determine a desired scan angle of one or more laser energy sources relative to the build surface at 402. The desired scan angle may be determined based, at least in part on the desired energy density. A scan angle may be one of a plurality of variables that may affect an energy density. Thus, a processor may control any appropriate operating parameters of the system to provide both a desired energy density and scan angle in each desired portion of the build surface. Operating parameters that may be controlled to provide a desired energy density for a given scan angle may include, for example, the number of activated lasers, the laser power or intensity, the dwell time and/or translation speed, the pulse rate, the amount of overlap between the paths of adjacent pixels and/or pixels arranged in a leading/trailing arrangement as described above, the focus of the one or more lasers, and/or any other appropriate operating parameter. Without wishing to be bound by theory, a higher energy density may be associated with a larger scan angle, a greater number of activated lasers, a greater laser power or intensity, a longer dwell time and/or slower translation speed, a faster pulse rate, and focusing a laser on a build surface. A lower energy density may be associated with a smaller scan angle, a lesser number of activated lasers, a lesser laser power or intensity, a shorter dwell time and/or faster translation speed, a slower pulse rate, and defocusing a laser on a build surface. Any number of these operating parameters and/or any other appropriate operating parameters may be controlled in conjunction to produce a desired energy density. In order to sustain high energy density without decreasing translation speed, it is possible to choose a large scan angle that provides sufficient overlap between adjacent beams such that the desired energy density is met. Alternatively, in order to reduce the energy density, a smaller build angle may be chosen, without varying other build parameters. These determinations could either be made dynamically during a build process based on sensor feedback or during a preprocessing step based on simulation feedback and/or experimentation.

After determining the desired scan angle and energy density, one or more groups of laser energy sources may be selectively activated at 404, according to appropriate operating parameters, as discussed above. The laser energy sources may be activated based, at least in part, on the desired energy density and the desired scan angle. The processor may then control the laser assembly to translate the one or more lasers beams emitted from the one or more groups of laser energy sources such that the laser beams translate across the build surface to form a desired pattern of welds to form a layer of the part at 406. As described previously, the lasers may translate in a direction corresponding to the desired scan angle. It should be appreciated that any of the above-noted parameters, or any other appropriate parameter, may be dynamically altered as the laser beams translate across the build surface. For example, individual lasers may be activated or deactivated at any time, and a scan angle may be continuously controlled. In some embodiments, the laser beams may translate across a layer multiple times. Each translation may be in a form of a single continuous trajectory or a plurality of discrete trajectories, based at least in part on the desired weld pattern of the layer.

At 408, the processor may determine if the build is complete. If the build is complete, the process may be ended at 412. If the build is not complete, the processor may operate the system to recoat the build surface with an appropriate material at 410 using a recoater, or other appropriate method. Afterwards, the process may be repeated to form the next layer using the above noted methods until the build process is complete.

It should be appreciated that a desired energy density and/or a desired scan angle of a second layer may be based, at least in part, on a desired energy density and/or a desired scan angle of a first layer. For example, in some embodiments, it may be desirable for a scan angle of a subsequent layer to be offset from a scan angle of a previously deposited layer. For example, it may be desirable that the scan angle increase or decrease from one layer to the next by a predetermined amount as previously described. Additionally, in some embodiments, it should be appreciated that a desired energy density and/or a desired scan angle of a second layer may either be the same or different from a desired energy density and/or a desired scan angle of a first layer. Additionally, in some embodiments, a scan angle of a second layer may be the same as a scan angle of a first layer.

In some embodiments, determining a desired scan angle (such as at 402) may include determining a desired scan angle that includes a predetermined deviation from a calculated scan angle. In some embodiments, it may be desirable to avoid scanning in the same directions repeatedly during a build process. Thus, in some embodiments an actual commanded scan angle may include a small deviation, such as a dither, around a nominal commanded scan angle. A dither may be in either direction relative to the nominal commanded scan angle. In some embodiments, a predetermined deviation from a desired scan angle may be less than or equal to 5°. During operation, a magnitude of a dither may be applied using either a randomly determined dither magnitude within the desired dither range, the dither may be systematically varied during operation, and/or any other desired method of applying a dither to the commanded scan angle may be implemented as the disclosure is not limited to how a dither is implemented.

Figure 5:
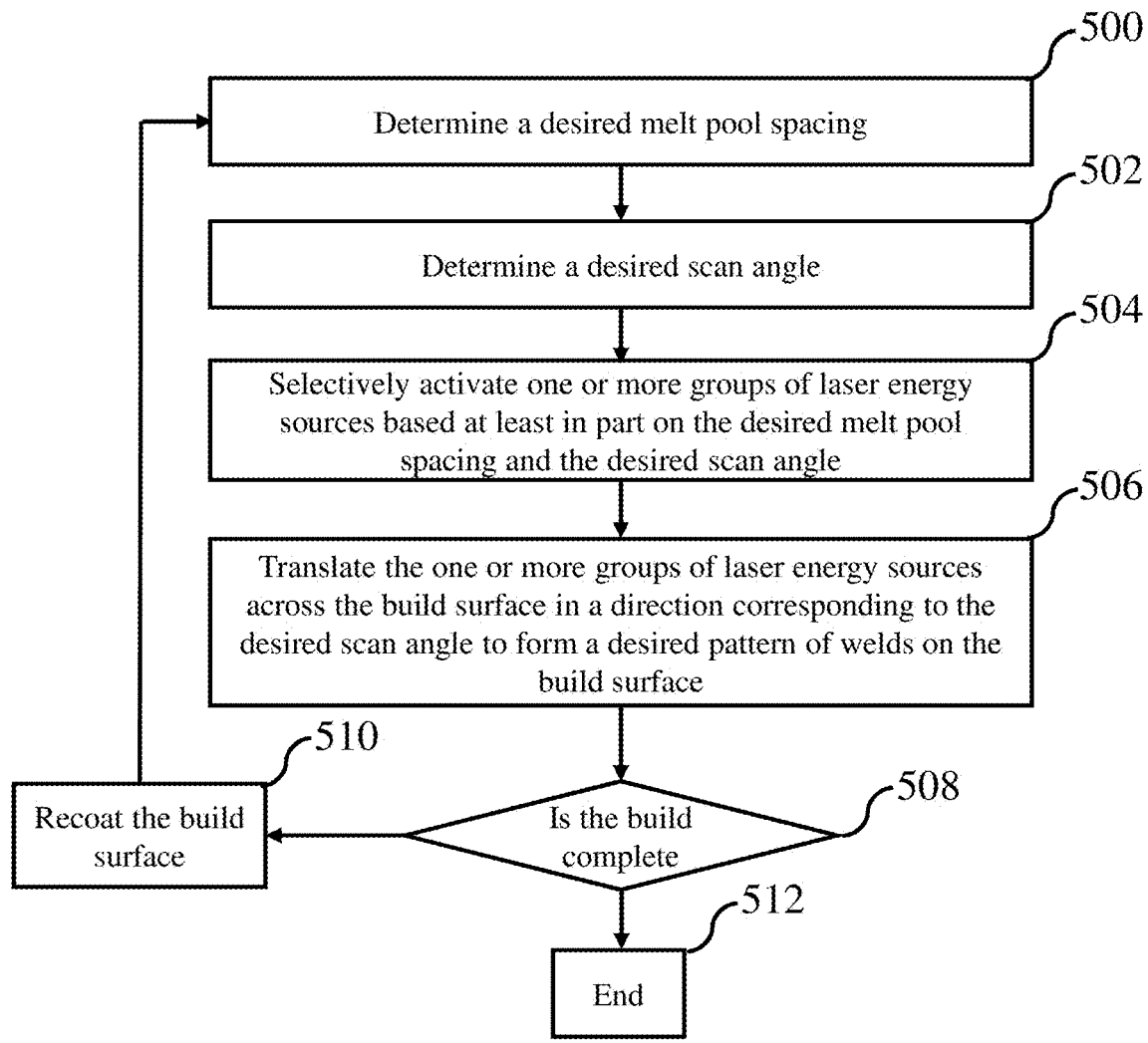
FIG. 5 depicts one embodiment of a method for operating an additive manufacturing system based at least in part on a desired melt pool spacing.

FIG. 5 depicts one embodiment of a method for operating an additive manufacturing system. At 500, a processor of the system may determine a desired weld and/or melt pool spacing for one or more portions of the build surface. For example, one, two, three, and/or any other appropriate number of desired weld and/or melt pools may be formed on a portion of a build surface when operating the system to form a given layer of a part. A melt pool spacing may refer to a spacing between any two of melt pools. A melt pool spacing may be measured from edge to edge, center to center, or any other suitable way. It should be understood that different weld and/or melt pool spacings may be used both within a single layer and/or within different adjacent layers of a part. For example, a second, third or any appropriate number of different melt pool spacings may be determined based at least in part on a corresponding weld height which may be different from the weld height used in another portion of an individual layer and/or in a separate layer of the part being formed by the additive manufacturing system. It should be appreciated that a melt pool spacing and the corresponding weld spacing may not be identical, due to factors such as thermal shrinkage, for example.

After determining a desired melt pool spacing, the processor may determine a desired scan angle of one or more laser energy sources relative to the build surface at 502. A scan angle may be one of a plurality of variables that may affect a melt pool spacing. The desired scan angle may be determined based, at least in part on the desired melt pool spacing. A processor may control any appropriate operating parameters of the system to provide the desired melt pool spacing in each desired portion of the build surface including, for example, the scan angle, the number of activated lasers, the laser power or intensity, the dwell time and/or translation speed, the pulse rate, and the focus of the one or more lasers. Without wishing to be bound by theory, a smaller melt pool spacing may be associated with a larger scan angle, a greater number of activated lasers, a greater laser power or intensity, a longer dwell time and/or slower translation speed, a faster pulse rate, and focusing a laser on a build surface. A larger melt pool spacing may be associated with a smaller scan angle, a lesser number of activated lasers, a lesser laser power or intensity, a shorter dwell time and/or faster translation speed, a slower pulse rate, and defocusing a laser on a build surface. Any number of these operating parameters and/or any other appropriate operating parameters may be controlled in conjunction to produce a desired melt pool spacing. For example, melt pool spacing may be altered during processing by altering power, translation speed, or scan angle. A determination of which parameter(s) to alter may be based at least in part on in situ feedback from sensors, simulations as a pre-processing step, and/or experimentation.

After determining the desired scan angle, one or more groups of laser energy sources may be selectively activated at 504. The laser energy sources may be activated based, at least in part, on the desired melt pool spacing and the desired scan angle. The processor may then translate the one or more lasers beams emitted from the one or more groups of laser energy sources such that the lasers translate across the build surface to form a desired pattern of welds to form a layer of the part at 506. As described previously, the lasers may translate in a direction corresponding to the desired scan angle. It should be appreciated that any of the above-noted parameters, or any other appropriate parameter, may be dynamically altered as the laser beams translate across the build surface. For example, individual lasers may be activated or deactivated at any time, and a scan angle may be continuously controlled. In some embodiments, the laser beams may translate across a layer multiple times. Each translation may be in a form of a single continuous trajectory or a plurality of discrete trajectories, based at least in part on the desired weld pattern of the layer.

At 508, the processor may determine if the build is complete. If the build is complete, the process may be ended at 512. If the build is not complete, the processor may operate the system to recoat the build surface with an appropriate material at 510. Afterwards, the process may be repeated to form the next layer using the above noted methods until the build process is complete.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

What is claimed is:

1. A method of controlling an energy density in an additive manufacturing process, the method comprising:
    determining a first desired energy density to be delivered to one or more portions of a build surface;
    determining a first desired scan angle of one or more laser energy sources;
    selectively activating the one or more laser energy sources based, at least in part, on the first desired energy density and the first desired scan angle; and
    translating, while the one or more laser energy sources are activated, the one or more laser energy sources in a first direction relative to the build surface corresponding to the first desired scan angle to form one or more weld tracks on the build surface.

2. The method of claim 1, wherein the one or more laser energy sources comprises an array of laser energy sources.

3. The method of claim 2, wherein the array of laser energy sources comprises a rectangular, linear, or hexagonal array of laser energy sources.

4. The method of claim 1, wherein determining the first desired scan angle of the one or more laser energy sources includes determining the first desired scan angle of the one or more laser energy sources based, at least in part, on the first desired energy density.

5. The method of claim 1, further comprising providing the first desired energy density to the one or more portions of the build surface by controlling a translation speed of the one or more laser energy sources as well as a number and intensity of the activated laser energy sources that translate over the one or more portions of the build surface.

6. The method of claim 1, wherein a path of travel relative to the build surface of at least a portion of the activated one or more laser energy sources are at least partially overlapped.

7. The method of claim 1, wherein determining the first desired scan angle includes determining the first desired scan angle based, at least in part, on a spacing of the one or more laser energy sources.

8. The method of claim 1, wherein the one or more laser energy sources are configured to produce one or more laser beam spots on the build surface, the method further comprising adjusting a spacing of the one or more laser beam spots based, at least in part, on the first desired energy density and the first desired scan angle.

9. The method of claim 1, further comprising:
    determining a second desired energy density to be delivered to the one or more portions of the build surface;
    determining a second desired scan angle of the one or more laser energy sources;
    selectively activating the one or more laser energy sources based, at least in part, on the second desired energy density and the second desired scan angle; and
    translating the one or more laser energy sources in a second direction relative to the build surface corresponding to the second desired scan angle.

10. The method of claim 9, wherein determining the second desired scan angle includes determining the second desired scan angle based, at least in part, on the first desired scan angle.

11. The method of claim 9, wherein the second desired energy density is different from the first desired energy density.

12. The method of claim 9, wherein the first desired scan angle is orthogonal to the second desired scan angle.

13. The method of claim 10, wherein determining the second desired scan angle based, at least in part, on the first desired scan angle includes determining the second desired scan angle based, at least in part, on the first desired scan angle and a predetermined deviation from the first desired scan angle.

14. The method of claim 13, wherein the predetermined deviation from the first desired scan angle is less than or equal to 5 degrees.

15. The method of claim 9, wherein the one or more laser energy sources are configured to produce one or more laser beam spots on the build surface, the method further comprising:
adjusting a spacing of the one or more laser beam spots based, at least in part, on the first desired energy density and the first desired scan angle; and
adjusting the spacing of the one or more laser beam spots based, at least in part, on the second desired energy density and the second desired scan angle.

16. An additive manufacturing system comprising:
a build surface;
one or more laser energy sources; and
a processor operatively coupled to the one or more laser energy sources, the processor configured to:
determine a first desired energy density to be delivered to one or more portions of the build surface;
determine a first desired scan angle of the one or more laser energy sources;
selectively activate the one or more laser energy sources based, at least in part, on the first desired energy density and the first desired scan angle; and
translate, while the one or more laser energy sources are activated, the one or more laser energy sources in a first direction relative to the build surface corresponding to the first desired scan angle to form one or more weld tracks on the build surface.

17. The additive manufacturing system of claim 16, wherein the one or more laser energy sources comprises an array of laser energy sources.

18. The additive manufacturing system of claim 17, wherein the array of laser energy sources comprises a rectangular, linear, or hexagonal array of laser energy sources.

19. The additive manufacturing system of claim 16, wherein the processor is configured to determine the first desired scan angle based, at least in part, on the first desired energy density.

20. The additive manufacturing system of claim 16, wherein the processor is configured to provide the first desired energy density to the one or more portions of the build surface by controlling a translation speed of the one or more laser energy sources as well as a number and intensity of the activated one or more laser energy sources that translate over the one or more portions of the build surface.

21. The additive manufacturing system of claim 16, wherein the processor is configured to translate the one or more laser energy sources such that a path of travel relative to the build surface of at least a portion of the activated one or more laser energy sources are at least partially overlapped.

22. The additive manufacturing system of claim 16, wherein the one or more laser energy sources comprises two or more laser energy sources that are spaced apart.

23. The additive manufacturing system of claim 16, wherein the one or more laser energy sources are configured to produce one or more laser beam spots on the build surface, wherein the processor is configured to adjust a spacing of the one or more laser beam spots based, at least in part, on the first desired energy density and the first desired scan angle.

24. A method of controlling melt pool spacing in an additive manufacturing process, the method comprising:
determining a desired melt pool spacing;
determining a desired scan angle of a plurality of laser energy sources;
selectively activating a plurality of separate portions of the plurality of laser energy sources based, at least in part, on the desired melt pool spacing and the desired scan angle to form a plurality of melt pools on a build surface that are spaced apart by the desired melt pool spacing; and
translating, while the plurality of separate portions of the plurality of laser energy sources are activated, the plurality of laser energy sources in a direction relative to the build surface corresponding to the desired scan angle to form one or more weld tracks on the build surface.

25. The method of claim 24, wherein a path of travel relative to the build surface of at least a portion of the activated laser energy sources are at least partially overlapped.

26. The method of claim 24, wherein a number of melt pools formed on the build surface is less than a number of activated laser energy sources.

27. The method of claim 24, wherein the desired melt pool spacing is between about 50 µm and about 50 mm.

28. The method of claim 24, wherein an energy density applied to the build surface, a translation speed of the plurality of laser energy sources, and the plurality of activated portions of the plurality of laser energy sources are selected such that a path of a first melt pool is adjacent to a path of a second melt pool along the build surface, and the first melt pool solidifies at a first location along a path of travel of the plurality of laser energy sources relative to the build surface prior to the second melt pool reaching the first location.

29. The method of claim 24, wherein the plurality of laser energy sources are configured to produce a plurality of laser beam spots on the build surface, the method further comprising adjusting a spacing of the plurality of laser beam spots based, at least in part, on the desired melt pool spacing and the desired scan angle.

30. An additive manufacturing system comprising:
a build surface;
a plurality of laser energy sources; and
a processor operatively coupled to the plurality of laser energy sources, the processor configured to:
determine a desired melt pool spacing;
determine a desired scan angle of the plurality of laser energy sources;
selectively activate a plurality of separate portions of the plurality of laser energy sources based, at least in part, on the desired melt pool spacing and the desired scan angle to form a plurality of melt pools on the build surface that are spaced apart by the desired melt pool spacing; and
translate, while the plurality of separate portions of the plurality of laser energy sources are activated, the plurality of laser energy sources in a direction relative to the build surface corresponding to the desired scan angle to form one or more weld tracks on the build surface.

31. The additive manufacturing system of claim 30, wherein the plurality of laser energy sources comprises an array of laser energy sources.

32. The additive manufacturing system of claim 31 wherein the array of laser energy sources comprises a rectangular, linear, or hexagonal array of laser energy sources.

33. The additive manufacturing system of claim 30, wherein the processor is configured to translate the plurality of laser energy sources such that a path of travel relative to the build surface of at least a portion of the activated laser energy sources are at least partially overlapped.

34. The additive manufacturing system of claim 30, wherein the plurality of laser energy sources are spaced apart.

35. The additive manufacturing system of claim 30, wherein the processor is configured to control an energy density applied to the build surface, a translation speed of the plurality of laser energy sources, and the plurality of activated portions of the plurality of laser energy sources such that a path of a first melt pool is adjacent to a path of a second melt pool along the build surface, and the first melt pool solidifies at a first location along a path of travel of the plurality of laser energy sources relative to the build surface prior to the second melt pool reaching the first location.

36. The additive manufacturing system of claim 30, wherein the plurality of laser energy sources are configured to produce a plurality of laser beam spots on the build surface, wherein the processor is configured to adjust a spacing of the plurality of laser beam spots based, at least in part, on the desired melt pool spacing and the desired scan angle.

37. The method of claim 1, wherein the one or more weld tracks comprises two or more weld tracks, and translating the one or more laser energy sources in the first direction comprises partially overlapping at least two of the two or more weld tracks on the build surface.

38. The additive manufacturing system of claim 16, wherein the one or more weld tracks comprises two or more weld tracks, and the processor is configured to partially overlap at least two of the two or more weld tracks on the build surface.

39. The method of claim 24, wherein the one or more weld tracks comprises two or more weld tracks, and translating the plurality of laser energy sources in the direction comprises partially overlapping at least two of the two or more weld tracks on the build surface.

40. The additive manufacturing system of claim 30, wherein the one or more weld tracks comprises two or more weld tracks, and the processor is configured to partially overlap at least two of the two or more weld tracks on the build surface.

41. The method of claim 1, further comprising fusing a build material with the one or more laser energy sources to form one or more parts on the build surface.

42. The method of claim 24, further comprising fusing a build material with the one or more laser energy sources to form one or more parts on the build surface.

43. The method of claim 1, wherein the one or more laser energy sources comprises two or more laser energy sources, and the first desired energy density delivered to the one or more portions of the build surface varies with a degree of overlap of at least two laser energy sources of the two or more laser energy sources.

44. The additive manufacturing system of claim 16, wherein the one or more laser energy sources comprises two or more laser energy sources, and the processor is configured to control at least two laser energy sources of the two or more laser energy sources to deliver first desired energy density that varies with a degree of overlap of the at least two laser energy sources to the one or more portions of the build surface.

45. The method of claim 24, wherein the desired melt pool spacing varies with a degree of overlap of at least two separate portions of the plurality of separate portions of the plurality of laser energy sources.

46. The additive manufacturing system of claim 30, wherein the processor is configured to control at least two separate portions of the plurality of separate portions of the plurality of laser energy sources to vary the desired melt pool spacing with a degree of overlap of the at least two separate portions of the plurality of separate portions of the plurality of laser energy sources.

47. The method of claim 1, further comprising determining a laser power corresponding to the first desired energy density and the first desired scan angle, and wherein selectively activating the one or more laser energy sources comprises changing a laser power of the one or more laser energy sources to the determined laser power.

* * * * *